United States Patent
Chou et al.

(10) Patent No.: US 10,187,655 B2
(45) Date of Patent: Jan. 22, 2019

(54) MEMORY-TO-MEMORY LOW RESOLUTION MOTION ESTIMATION SYSTEMS AND METHODS

(71) Applicant: Apple Inc., Cupertino, CA (US)

(72) Inventors: Jim C. Chou, San Jose, CA (US); Mark P. Rygh, Union City, CA (US); Guy Côté, San Jose, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 14/871,827

(22) Filed: Sep. 30, 2015

(65) Prior Publication Data

US 2017/0094311 A1  Mar. 30, 2017

(51) Int. Cl.
*H04N 19/53* (2014.01)
*H04N 19/52* (2014.01)
(Continued)

(52) U.S. Cl.
CPC .......... *H04N 19/53* (2014.11); *H04N 19/109* (2014.11); *H04N 19/117* (2014.11); *H04N 19/13* (2014.11); *H04N 19/132* (2014.11); *H04N 19/139* (2014.11); *H04N 19/147* (2014.11); *H04N 19/159* (2014.11); *H04N 19/179* (2014.11); *H04N 19/186* (2014.11);
(Continued)

(58) Field of Classification Search
CPC .... H04N 19/53; H04N 19/109; H04N 19/117; H04N 19/13
See application file for complete search history.

(56) References Cited

U.S. PATENT DOCUMENTS 5,418,570 A * 5/1995 Ueno .................. H04N 19/105
                                                        348/699
2005/0157198 A1* 7/2005 Larner ............... H04N 5/23212
                                                        348/345
(Continued)

OTHER PUBLICATIONS

Chen et al.; "Analysis and Architecture Design of Variable Block-Size Motion Estimation for H.264/AVC," IEEE Transactions on Circuits and Systems—I: Regular Papers, vol. 53, No. 2, Feb. 2006; pp. 578-593.

(Continued)

*Primary Examiner* — Jonathan R Messmore
(74) *Attorney, Agent, or Firm* — Fletcher Yoder PC

(57) ABSTRACT

System and method for improving operational efficiency of a video encoding pipeline used to encode image data. In embodiments, the video encoding pipeline includes a low resolution pipeline that includes a low resolution motion estimation block, which generates downscaled image data by reducing resolution of the image data and determines a low resolution inter-frame prediction mode by performing a motion estimation search using the downscaled image data and previously downscaled image data. The video encoding pipeline also includes a main pipeline in parallel with the low resolution pipeline that includes a motion estimation block, which determines a candidate inter-frame prediction mode based at least in part on the low resolution inter-frame prediction mode, and a mode decision block, which determines a first rate-distortion cost associated with the candidate inter-frame prediction mode and determines prediction mode used to prediction encode the image data based at least in part on the first rate-distortion cost.

28 Claims, 13 Drawing Sheets

(51) Int. Cl.
  *H04N 19/109* (2014.01)
  *H04N 19/567* (2014.01)
  *H04N 19/147* (2014.01)
  *H04N 19/56* (2014.01)
  *H04N 19/179* (2014.01)
  *H04N 19/186* (2014.01)
  *H04N 19/70* (2014.01)
  *H04N 19/117* (2014.01)
  *H04N 19/13* (2014.01)
  *H04N 19/132* (2014.01)
  *H04N 19/40* (2014.01)
  *H04N 19/139* (2014.01)
  *H04N 19/159* (2014.01)
  *H04N 19/593* (2014.01)

(52) U.S. Cl.
  CPC ............. *H04N 19/40* (2014.11); *H04N 19/52* (2014.11); *H04N 19/56* (2014.11); *H04N 19/567* (2014.11); *H04N 19/593* (2014.11); *H04N 19/70* (2014.11)

(56) References Cited

U.S. PATENT DOCUMENTS

| | | |
|---|---|---|
| 2006/0008008 A1 | 1/2006 | Song |
| 2008/0008349 A1* | 1/2008 | Binnig ............... G06K 9/00127 382/100 |
| 2008/0211941 A1* | 9/2008 | Deever ................ H04N 5/2258 348/262 |
| 2008/0310502 A1* | 12/2008 | Kim ..................... H04N 19/176 375/240.02 |
| 2011/0286523 A1 | 11/2011 | Dencher |
| 2012/0027089 A1* | 2/2012 | Chien .................... H04N 19/52 375/240.15 |
| 2013/0022102 A1* | 1/2013 | Casula ................ H04N 19/176 375/240.02 |
| 2013/0329008 A1* | 12/2013 | Takahashi .......... H04N 13/0048 348/43 |
| 2015/0264390 A1* | 9/2015 | Laroche ............... H04N 19/105 375/240.16 |
| 2015/0281752 A1* | 10/2015 | Van Veldhuisen ........................... H04N 21/2368 725/116 |
| 2015/0341659 A1* | 11/2015 | Lou ..................... H04N 19/105 375/240.15 |

OTHER PUBLICATIONS

Lin et al.; "PMRME: A Parallel Multi-Resolution Motion Estimation Algorithm and Architecture for HDTV Sized H.264 Video Coding," IEEE ICASSP 2007, pp. II-385-II-388.

\* cited by examiner

MEMORY-TO-MEMORY LOW RESOLUTION MOTION ESTIMATION SYSTEMS AND METHODS

BACKGROUND

The present disclosure generally relates to image data encoding and, more particularly, to motion estimation used for image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Often, an electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, prediction techniques may be used to indicate the image data by referencing other image data. For example, since successively displayed image frames may be generally similar, inter-frame prediction techniques may be used to indicate image data (e.g., a prediction unit) corresponding with a first image frame by referencing image data (e.g., a reference sample) corresponding with a second image frame, which may be displayed directly before or directly after the first image frame. To facilitate identifying the reference sample, a motion vector may indicate position of a reference sample in the second image frame relative to position of a prediction unit in the first image frame. In other words, instead of directly compressing the image data, the image data may be encoded based at least in part on a motion vector used to indicate desired value of the image data.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded, for example, using inter-frame prediction techniques. However, determining motion vectors used to encode image data with inter-frame prediction techniques may be computationally complex, for example, due to amount of image data searched to determine candidate motion vectors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate, a video encoding pipeline may determine encoding operational parameters and implement the encoding operational parameters to encode the source image data. In some embodiments, the source image data may be encoded using prediction techniques (e.g., intra-frame prediction techniques or inter-frame prediction techniques) by referencing other image data. For example, intra-frame prediction techniques may facilitate encoding source image data by referencing image data used to display the same image frame. Additionally, inter-frame prediction techniques may facilitate encoding source image data by referencing image data used to display other image frames.

To implement inter-frame prediction techniques, the video encoding pipeline may determine a reference sample in a second (e.g., reference) image frame for source image data corresponding with a first image frame using an inter-frame prediction mode. In some embodiments, the inter-frame prediction mode may include a motion vector that indicates position (e.g., spatial position) of the reference sample in the second image frame relative to position of the source image data in the first image frame. Additionally, the inter-frame prediction mode may include a reference index that indicates display order (e.g., temporal position) of the second image frame relative to the first image frame.

To determine the inter-frame prediction mode, a motion estimation (ME) block in the video encoding pipeline may determine one or more candidate inter-frame prediction modes. In some embodiments, the motion estimation block may perform a motion estimation search to determine reference samples that are similar to the source image data. Once a reference sample is determined, the motion estimation block may determine a motion vector and reference index to indicate location (e.g., spatial position and temporal position) of the reference sample relative to the source image data. Generally, performing motion estimation searches may be computationally complex and, thus, time consuming. However, duration provided for the motion estimation block to perform its search may be limited, particularly to enable real-time or near real-time transmission or display as refresh rate and/or resolution increases.

Accordingly, the present disclosure provides techniques to improve operational efficiency of the video encoding pipeline. In some embodiments, operational efficiency may be improved by including a low resolution pipeline in parallel with a main pipeline, which determines encoding operational parameters used to encode the source image data. Additionally, in some embodiments, the low resolution pipeline and the main pipeline may both provide direct memory access (DMA) to source image data stored in memory. Thus, in such embodiments, the low resolution pipeline and the main pipeline may operate using relatively independent operational timing, which may enable the low resolution pipeline to operate one or more image frames ahead of the main pipeline. In this manner, the low resolution pipeline may determine information ahead of time for use in the main pipeline. By running the low resolution pipeline at least one frame ahead of the main pipeline, information (e.g., statistics and/or low resolution inter-frame prediction modes) determined by the low resolution pipeline may be used by the main pipeline, for example, to facilitate identifying a scene change, determining global motion information, determining motion-weight (e.g., lambda) tuning information used in rate-distortion calculations, frame-rate conversion, image stabilization, or any combination thereof.

For example, the low resolution pipeline may include a low resolution motion estimation (LRME) block that processes the source image data to determine low resolution inter-frame prediction modes. In some embodiments, the low resolution motion estimation block may downscale the source image data and perform a motion estimation search on previously downscaled image data to determine a downscaled reference sample that is similar to the downscaled source image data. To indicate location of the downscaled reference sample, the low resolution motion estimation block may determine a low resolution inter-frame prediction mode, which includes a motion vector and a reference index.

Since downscaled image data should be similar to full resolution image data, low resolution inter-frame prediction modes may provide an indication where reference samples in full resolution are expected to be located. Thus, the motion estimation block in the main pipeline may be initialized with the low resolution inter-frame prediction modes as candidates. In this manner, the low resolution motion estimation block may facilitate reducing amount of image data searched by the motion estimation block and, thus, improving operational efficiency of the video encoding pipeline.

Additionally, when one or more image frames ahead of the main pipeline, the low resolution motion estimation block may determine statistics based at least in part on luma of the source image data, which may be used to determine when (e.g., at what image frame) a scene change is expected to occur, global motion across multiple image frames used for image stabilization, motion-weight (e.g., lambda) tuning information used in rate-distortion calculations, frame-rate conversion, or any combination thereof. For example, the low resolution motion estimation block may determine luma histogram statistic that indicates number of pixels in the downscaled source image data at each luma value. Additionally or alternatively, the low resolution motion estimation block may determine a zero vector sum of absolute difference (SAD) statistic that indicates difference between the downscaled source image data and a downscaled reference sample identified by a zero vector (e.g., motion vector with zero horizontal and zero vertical offset).

In some embodiments, the statistics may indicate the amount that successively display image frames are expected to change and, thus, when a scene change is expected to occur. For example, when difference between luma histograms for successively displayed image frames differ by more than a histogram threshold, the video encoding pipeline may determine that a scene change is expected to occur between those image frames. Additionally, when the zero vector sum of absolute difference is above an upper SAD threshold, the video encoding pipeline may determine that a scene change is expected to occur between the image frames used to calculate the zero vector sum of absolute difference.

Since premised on successively displayed image frames being similar, effectiveness of inter-frame prediction techniques may be greatly reduced across a scene change. As such, where a scene change is expected to occur, the main pipeline may select a prediction mode from one or more candidate intra-frame prediction modes and/or a skip mode. Thus, in some embodiments, the motion estimation block may be disabled, which may reduce computational complexity in the main pipeline, improve operational efficiency of the video encoding pipeline, and/or reduce power consumption.

BRIEF DESCRIPTION OF THE DRAWINGS

Various aspects of this disclosure may be better understood upon reading the following detailed description and upon reference to the drawings in which.

DETAILED DESCRIPTION

Figure 1:
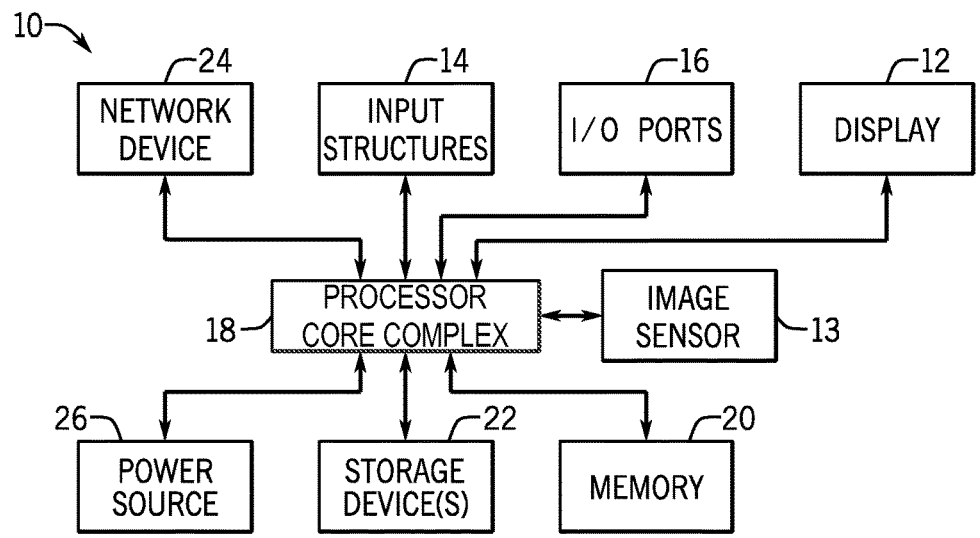
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

In some embodiments, a video encoding pipeline may determine encoding operational parameters and implement the encoding operational parameters to encode source image data. To facilitate encoding, source image data for an image frame may be divided into one or more coding units. As used herein, a "coding unit" is intended to describe a sample of source image data (e.g., pixel image data) corresponding to a group of display pixels, which is encoded using the same prediction technique.

Accordingly, the video encoding pipeline may determine a prediction technique (e.g., intra-frame prediction techniques or inter-frame prediction techniques) to implement on a coding unit, thereby generating a prediction sample. Prediction techniques may facilitate encoding by enabling the source image data to be indicated via reference to other image data. For example, since an image frame may change gradually, the video encoding pipeline may utilize intra-frame prediction techniques to produce a prediction sample based on image data used to display the same image frame. Additionally, since successively displayed image frames may change gradually, the video encoding pipeline may utilize inter-frame prediction techniques to produce a prediction sample based on image data used to display other image frames.

Although conceptually similar, each prediction technique may include one or more prediction modes that utilize different encoding schemes. As such, different prediction modes may result in different prediction samples. For example, utilizing a first intra-frame prediction mode (e.g., vertical prediction mode), the video encoding pipeline may produce a prediction sample with each column set equal to image data for a pixel directly above the column. On the other hand, utilizing a second intra-frame prediction mode (e.g., DC prediction mode), the video encoding pipeline may produce a prediction sample set equal to an average of adjacent pixel image data. Additionally, utilizing a first inter-frame prediction mode (e.g., first reference index and first motion vector), the video encoding pipeline may produce a prediction sample based on a reference sample at a first position within a first image frame. On the other hand, utilizing a second inter-frame prediction mode (e.g., second reference index and second motion vector), the video encoding pipeline may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding pipeline may evaluate candidate prediction modes (e.g., candidate inter-frame prediction modes, candidate intra-frame prediction modes, and/or a skip mode) to determine what prediction mode to use for each prediction unit in a coding unit. To facilitate, a motion estimation (ME) block in the video encoding pipeline may determine one or more candidate inter-frame prediction modes. In some embodiments, an inter-frame prediction mode may include a reference index (e.g., temporal position), which indicates which image frame a reference sample is located, and a motion vector (e.g., spatial position), which indicates position of the reference sample relative to a prediction unit.

To determine a candidate inter-frame prediction mode, the motion estimation block may search image data (e.g., reconstructed samples) used to display other image frames for reference samples that are similar a prediction unit. Once a reference sample is determined, the motion estimation block may determine a motion vector and reference index to indicate location of the reference sample.

Generally, the quality of the match between prediction unit and reference sample may be dependent on search area (e.g., amount of image data). For example, increasing search area may improve likelihood of finding a closer match with the prediction unit. However, increasing search area may also increase computation complexity and, thus, searching duration. In some embodiments, a duration provided for the motion estimation block to perform its search may be limited, for example, to enable real-time or near real-time transmission and/or display.

Accordingly, as will be described in more detail below, the present disclosure provides techniques to improve operational efficiency of a video encoding pipeline and, particularly, a main pipeline that includes a motion estimation block. In some embodiments, operational efficiency may be improved by including a low resolution pipeline in parallel with the main pipeline. Additionally, in some embodiments, the low resolution pipeline and the main pipeline may both provide direct memory access (DMA) to source image data stored in memory. Thus, in such embodiments, the low resolution pipeline and the main pipeline may operate using relatively independent operational timing. In fact, the low resolution pipeline may operate one or more image frames ahead of the main pipeline, which may enable the low resolution pipeline to determine information (e.g., low resolution inter-frame prediction modes, luma histogram statistics, and/or sum of absolute difference statistics) ahead of time for use in the main pipeline.

To facilitate, the low resolution pipeline may include a low resolution motion estimation (LRME) block. In some embodiments, the low resolution motion estimation block may downscale source image data (e.g., a coding unit). For example, a low resolution motion estimation block may downscale a 32×32 coding unit to one-sixteenth resolution to generate an 8×8 downscaled coding unit.

The low resolution motion estimation block may then search previously downscaled source image data to find a downscaled reference samples that are similar to a downscaled prediction unit within the downscaled coding unit. To indicate location of the downscaled reference sample, the low resolution motion estimation block may determine a low resolution inter-frame prediction mode, which includes a motion vector and a reference index. More specifically, the motion vector may indicate spatial position of a reference sample in full resolution corresponding with the downscaled reference sample relative to a prediction unit in full resolution corresponding with the downscaled prediction unit. Additionally, the reference index may indicate display order (e.g., temporal position) of a reference image frame corresponding with the downscaled reference sample relative to an image frame corresponding with the downscaled prediction unit.

The low resolution motion estimation block may then enable the low resolution inter-frame prediction mode to be accessed and used by the main pipeline. In some embodiments, the low resolution motion estimation block may store the low resolution inter-frame prediction mode in memory using direct memory access and the main pipeline may retrieve the low resolution inter-frame prediction mode using direct memory access. Additionally, the low resolution motion estimation block may store the downscaled source image data in memory for use in subsequent low resolution motion estimation searches.

In some embodiments, the motion estimation block in the main pipeline may retrieve candidate inter-frame prediction modes from memory. For each candidate inter-frame prediction mode, the motion estimation block may perform a motion estimation search within a range of pixels (e.g., +/−3 pixel area) and/or sub-pixels (e.g., +/−0.5 pixel area) around its indicated reference sample in full resolution. Since downscaled image data should be similar to full resolution image data, low resolution inter-frame prediction modes may provide an indication where closely matching reference samples are expected to be located. As such, the motion estimation block may utilize the low resolution inter-frame prediction modes as candidates. In this manner, the low resolution motion estimation block may facilitate reducing amount of image data searched by the motion estimation block and, thus, searching duration, which may facilitate real-time or near real-time transmission and/or display of image data.

Additionally, when one or more image frames ahead of the main pipeline, the low resolution motion estimation block may determine statistics used to improve operational efficiency of the main pipeline. For example, the low resolution motion estimation block may determine luma histogram statistics that indicate number of pixels in downscaled image data at each possible luma value. Additionally or alternatively, the low resolution motion estimation block may determine a zero vector sum of absolute difference (SAD) statistics, which may indicate difference between a downscaled prediction unit and a downscaled reference sample indicated by a zero vector. In some embodiments, the statistics may be used to detect when a scene change is expected to occur.

As described above, inter-frame prediction techniques are premised on successively displayed image frames being similar. Thus, effectiveness of inter-frame prediction techniques across a scene change may be greatly reduced. As such, the main pipeline may select a prediction mode from one or more candidate intra-frame prediction modes and/or a skip mode. Thus, in some embodiments, the motion estimation block may be disabled, which may reduce computational complexity in the main pipeline, improve operational of the main pipeline, and/or reduce power consumption.

To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is operably coupled with I/O ports 16, which may enable the computing device 10 to interface with various other electronic devices. For example, a portable storage device may be connected to an I/O port 16, thereby enabling the processor core complex 18 to communicate data with a portable storage device. In this manner, the I/O ports 16 may enable the computing device 10 to output encoded image data to the portable storage device and/or receive encoding image data from the portable storage device.

As depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor core complex 18 may retrieve encoded image data from local memory 20, decode the encoded image data, and instruct the electronic display 12 to display image frames based on the decoded image data.

Figure 2:
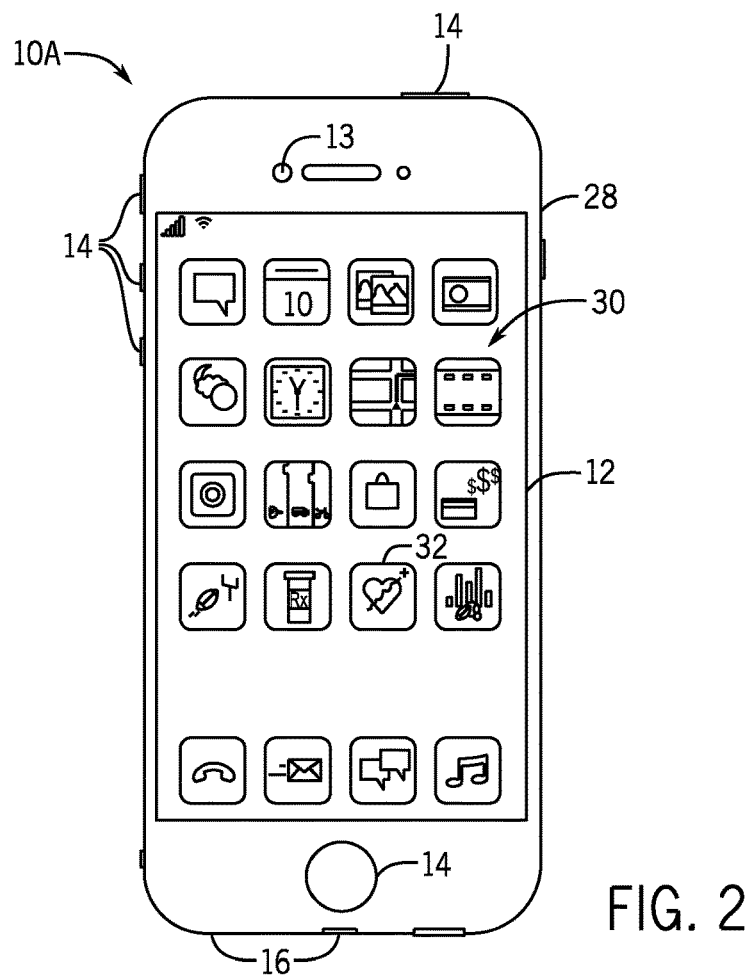
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
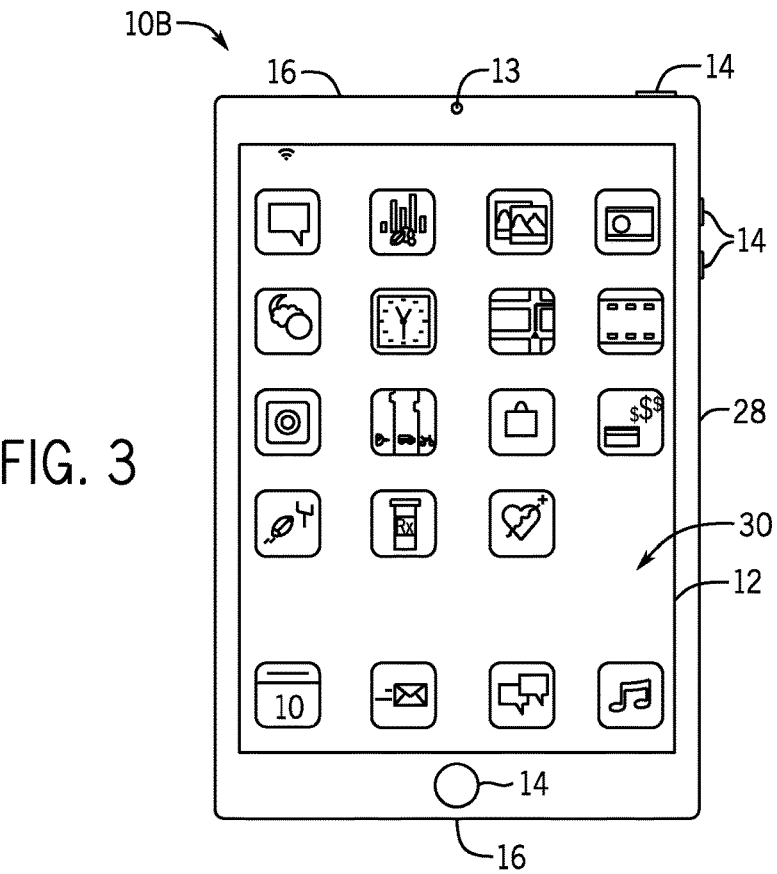
FIG. 3 is an example of the electronic device of FIG. 1, in accordance with an embodiment.
Figure 4:
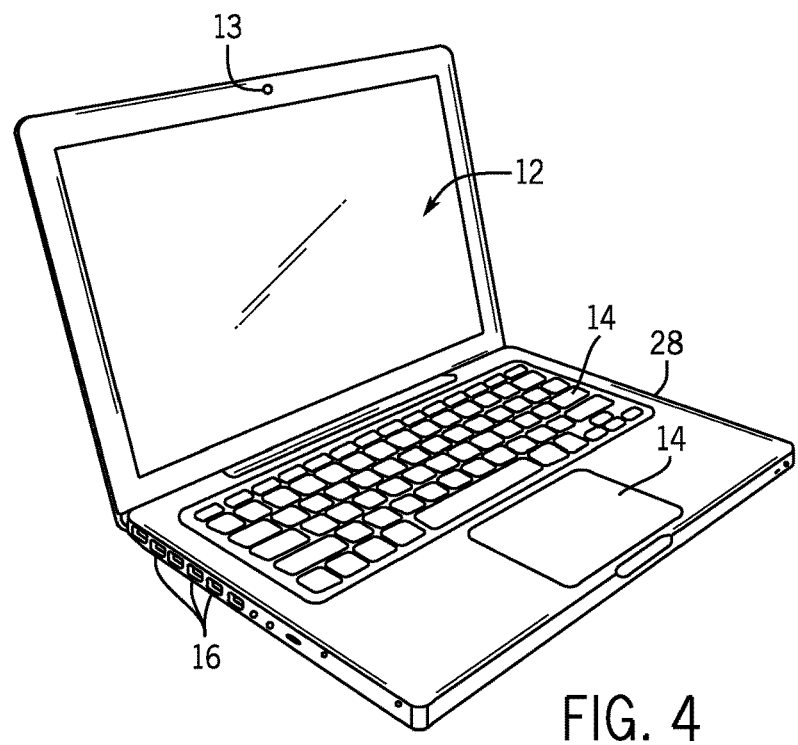
FIG. 4 is an example of the electronic device of FIG. 1, in accordance with an embodiment.
Figure 5:
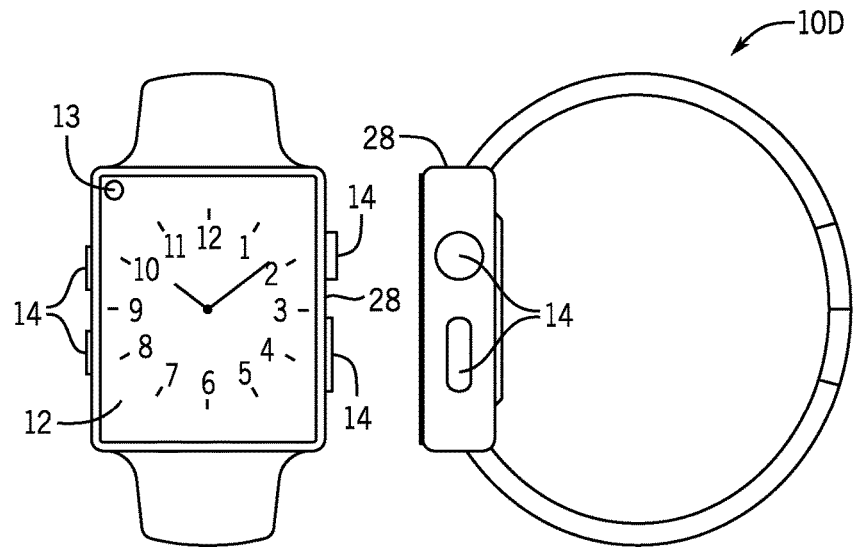
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode image data may be limited, particularly as resolution of image frames and/or refresh rates of electronic displays 12 increase.

Figure 6:
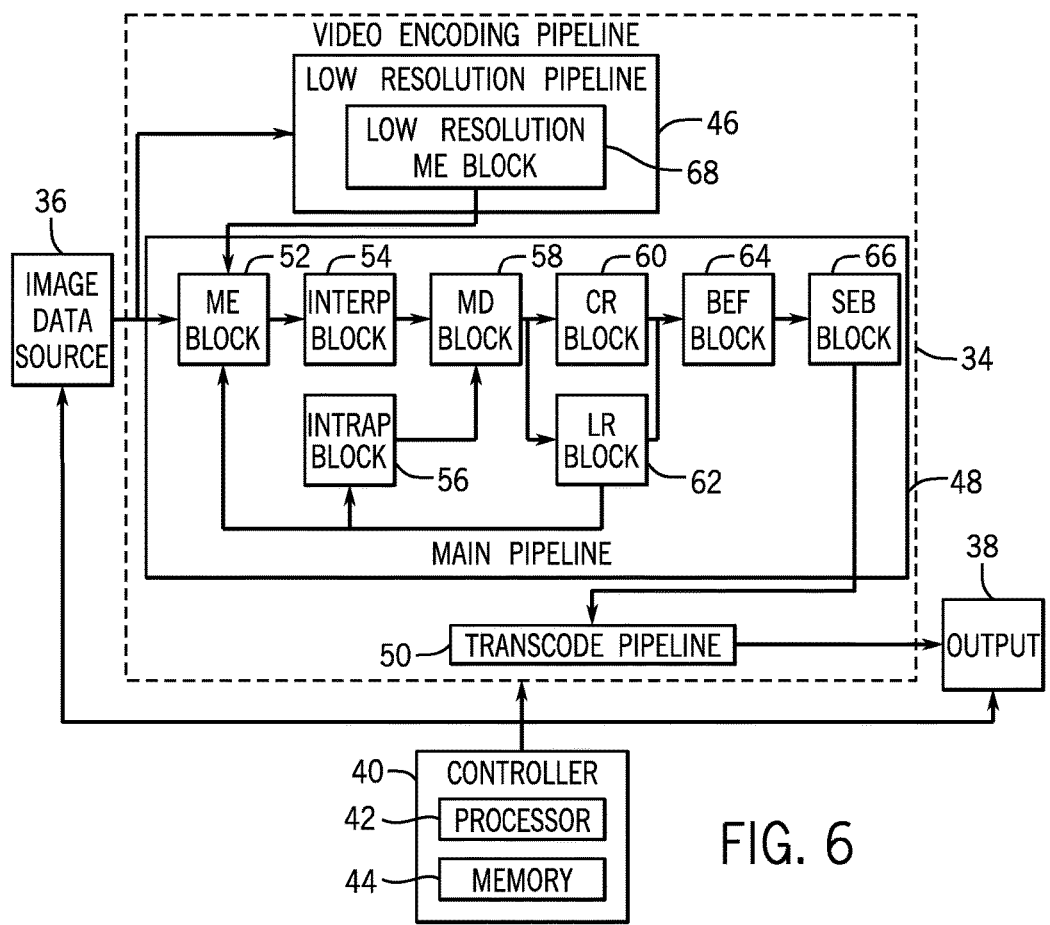
FIG. 6 is block diagram of a video encoding pipeline used to encode image data, in accordance with an embodiment.

One embodiment of a video encoding pipeline 34 that may be used to encode image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, one or more separate controllers 40 may be used to control operation of the image data source 36, the video encoding pipeline 34, the output 38, or any combination thereof.

To facilitate controlling operation, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired with instructions that control operation in the image data source 36, the video encoding pipeline 34, and/or the output 38 when executed. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

As depicted, the video encoding pipeline 34 is communicatively coupled to the image data source 36. In this manner, the video encoding pipeline 34 may receive source image data from the image data source 36. Thus, in some embodiments, the image data source 36 may be the image sensor 13 and/or any other suitable device that generates source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the main memory storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a low resolution pipeline 46, a main pipeline 48, and a transcode pipeline 50. As will be described in more detail below, the main pipeline 48 may encode source image data using prediction techniques (e.g., inter-frame prediction techniques or intra-frame prediction techniques) and the transcode pipeline 50 may subsequently entropy encode syntax elements that indicate encoding operational parameters (e.g., quantization coefficient, inter-frame prediction mode, and/or intra-frame prediction mode) used to prediction encode the image data.

To facilitate prediction encoding source image data, the main pipeline 48 may perform various functions. To simplify discussion, the functions are divided between various blocks (e.g., circuitry or modules) in the main pipeline 48. In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit. In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter (e.g., half resolution in the horizontal direction and half resolution in the vertical direction) the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of a prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter-frame prediction modes that can be used to encode a prediction unit. As described above, an inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter-frame prediction mode, the motion estimation block 52 may search reconstructed luma image data, which may be received from the luma reconstruction block 62. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate inter-frame prediction modes (e.g., reference index and motion vector) for one or more prediction units in the coding unit. The motion estimation block 52 may then input candidate inter-frame prediction modes to the inter-frame prediction block 54. Based at least in part on the candidate inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate inter-frame prediction mode to the mode decision block 58 for consideration. In some embodiments, the inter-frame prediction block 54 may sort the candidate inter-frame prediction modes based on associated mode cost and input only a specific number to the mode decision block 58.

The mode decision block 58 may also consider one or more candidate intra-frame predictions modes and corresponding luma prediction samples output by the intra-frame prediction block 56. The main pipeline 48 may be capable of using multiple (e.g., 17 or 35) different intra-frame prediction modes to generate luma prediction samples based on adjacent pixel image data. Thus, in some embodiments, the intra-frame prediction block 56 may determine a candidate intra-frame prediction mode and corresponding luma prediction sample for a prediction unit based at least in part on luma of reconstructed image data for adjacent (e.g., top, top right, left, or bottom left) pixels, which may be received from the luma reconstruction block 62.

For example, utilizing a vertical prediction mode, the intra-frame prediction block 56 may set each column of a luma prediction sample equal to reconstructed luma of a pixel directly above the column. Additionally, utilizing a DC prediction mode, the intra-frame prediction block 45 may set a luma prediction sample equal to an average of reconstructed luma of pixels adjacent the prediction sample. The intra-frame prediction block 56 may then input candidate intra-frame prediction modes and corresponding luma prediction samples to the mode decision block 58 for consideration. In some embodiments, the intra-frame prediction block 56 may sort the candidate intra-frame prediction modes based on associated mode cost and input only a specific number to the mode decision block 58.

The mode decision block 58 may determine encoding operational parameters used to encode the source image data (e.g., coding block). In some embodiments, the encoding operational parameters for a coding block may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To facilitate determining the encoding operational parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame, source image data may be encoding by referencing image data used to display a previous image frame. Additionally, in a B-frame, source image data may be encoded by referencing both image data used to display a previous image frame and image data used to display a subsequently image frame. Accordingly, when the image frame is a P-frame or a B-frame, the mode decision block 58 may determine each coding unit in the image frame may be prediction encoded using either intra-frame techniques or inter-frame techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe number, size, location, and prediction mode of luma prediction blocks in a coding unit. Thus, the mode decision block 58 may determine a candidate inter-frame prediction mode configuration using one or more of the candidate inter-frame prediction modes received from the inter-frame prediction block 54. Additionally, the mode decision block 58 may determine a candidate intra-frame prediction mode configuration using one or more of the candidate intra-frame prediction modes received from the intra-frame prediction block 56.

Since a coding block may utilize the same prediction technique, the mode decision block 58 may determine prediction technique for a coding unit by comparing rate-distortion cost associated with the candidate prediction mode configurations and/or a skip mode. In some embodiments, the rate-distortion cost may be as follows:

$$RD = A(\text{rate\_cost}) + B(\text{distortion}) \quad (1)$$

where RD is the rate-distortion cost, rate is estimated rate expected to be used to indicate the source image data, distortion is a distortion metric (e.g., sum of squared difference), A is a weighting factor for the estimated rate, and B is a weighting factor for the distortion metric.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the luma reconstruction block 62. As will be described in more detail below, reconstructed image data may be generated by subtracting a prediction sample from source image data to determine a prediction residual, performing a forward transform and quantization (FTQ) on the prediction residual, performing an inverse transform and quantization (ITQ) to determine a reconstructed prediction residual, and adding the reconstructed prediction residual to the prediction sample.

In some embodiments, the prediction residual of a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra-frame prediction mode configuration may include expected number of bits used to indicate intra-frame prediction technique (e.g., coding unit overhead), expected number of bits used to indicate intra-frame prediction mode, expected number of bits used to indicate a prediction residual (e.g., source image data−prediction sample), and expected number of bits used to indicate a transform unit split. On the other hand, the estimated rate for an inter-frame prediction mode configuration may include expected number of bits used to indicate inter-frame prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion cost of equation (1) is used, the mode decision block 58 may select prediction mode configuration or skip mode with the lowest associated rate-distortion cost for a coding unit. In this manner, the mode decision block 58 may determine encoding operational parameters for a coding block, which may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To improve quality of decoded image data, the main pipeline 48 may then mirror decoding of encoded image data. To facilitate, the mode decision block 58 may output the encoding operational parameters and/or luma prediction samples to the chroma reconstruction block 60 and the luma reconstruction block 62. Based on the encoding operational parameters, the luma reconstruction block 62 and the chroma reconstruction block 60 may determine reconstruct image data.

More specifically, the luma reconstruction block 62 may generate the luma component of reconstruct image data. In some embodiments, the luma reconstruction block 62 may generate reconstructed luma image data by subtracting the luma prediction sample from luma of the source image data to determine a luma prediction residual. The luma reconstruction block 62 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The luma reconstruction block 62 then add the reconstructed luma prediction residual to the luma prediction sample to determine reconstructed luma image data. As described above, the reconstructed luma image data may then be fed back for use in other blocks in the main pipeline 48. Additionally, the reconstructed luma image data may be output to the back-end-filter block 64.

On the other hand, the chroma reconstruction block 60 may generate both chroma components of reconstructed image data. In some embodiments, chroma reconstruction may be dependent on sampling format. For example, when luma and chroma are sampled at the same resolution (e.g., 4:4:4 sampling format), the chroma reconstruction block 60 may utilize the same encoding operational parameters as the luma reconstruction block 62. In such embodiments, for each chroma component, the chroma reconstruction block 60 may generate a chroma prediction sample by applying the prediction mode configuration determined by the mode decision block 58 to adjacent pixel image data.

The chroma reconstruction block 60 may then subtract the chroma prediction sample from chroma of the source image data to determine a chroma prediction residual. Additionally, the chroma reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, what may be input to the back-end-filter block 64.

However, in other embodiments, chroma sampling resolution may vary from luma sampling resolution, for example when a 4:2:2 or 4:2:0 sampling format is used. In such embodiments, encoding operational parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decode image data, the back-end-filter block 64 may then filter the reconstructed image data (e.g., reconstructed chroma image data and/or reconstructed luma image data). In some embodiments, the back-end-filter block 64 may perform deblocking and/or sample adaptive offset (SAO) functions. For example, the back-end-filter block 64 may perform deblocking on the reconstructed image data to reduce perceivability of blocking artifacts that may be introduced. Additionally, the back-end-filter block 64 may perform a sample adapt offset function by adding offsets to portions of the reconstructed image data.

To enable decoding, encoding operational parameters used to generate encoded image data may be communicated to a decoding device. In some embodiments, the encoding operational parameters may include the encoding operational parameters determined by the mode decision block 58 (e.g., prediction unit configuration and/or transform unit configuration), encoding operational parameters used by the luma reconstruction block 62 and the chroma reconstruction block (e.g., quantization coefficients), and encoding operational parameters used by the back-end-filter block 64. To facilitate communication, the encoding operational parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to communicate the encoding operational parameters may be reduced using entropy encoding, such as context adaptive binary arithmetic coding (CABAC) and/or context-adaptive variable-length coding (CAVLC). To facilitate, the syntax element binarization block 66 may receive encoding operational parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generated the binary symbol using exp-golomb, fixed length, truncated unary, truncated rice, or any combination thereof. In this manner, the syntax element binarization block 66 may generate a bin stream, which is supplied to the transcode pipeline 50.

The transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As described above, the duration provided for encoding image data may be limited, particularly to enable real-time or near real-time display and/or transmission. To improve operational efficiency (e.g., operating duration and/or power consumption) of the main pipeline 48, the low resolution pipeline 46 may include a low resolution motion estimation (ME) block 68. As will be described in more detail below, the low resolution motion estimation block 68 may improve operational efficiency by initializing the motion estimation block 52 with candidate inter-frame prediction modes, which may facilitate reducing search performed by the motion estimation block 52. Additionally, the low resolution motion estimation block 68 may improve operational efficiency by indicating where scene changes are expected to occur to the mode decision block 58 and/or the motion estimation block 52, which may enable only considering candidate intra-frame prediction modes and a skip mode and, thus, disabling the motion estimation block 52.

Figure 7:
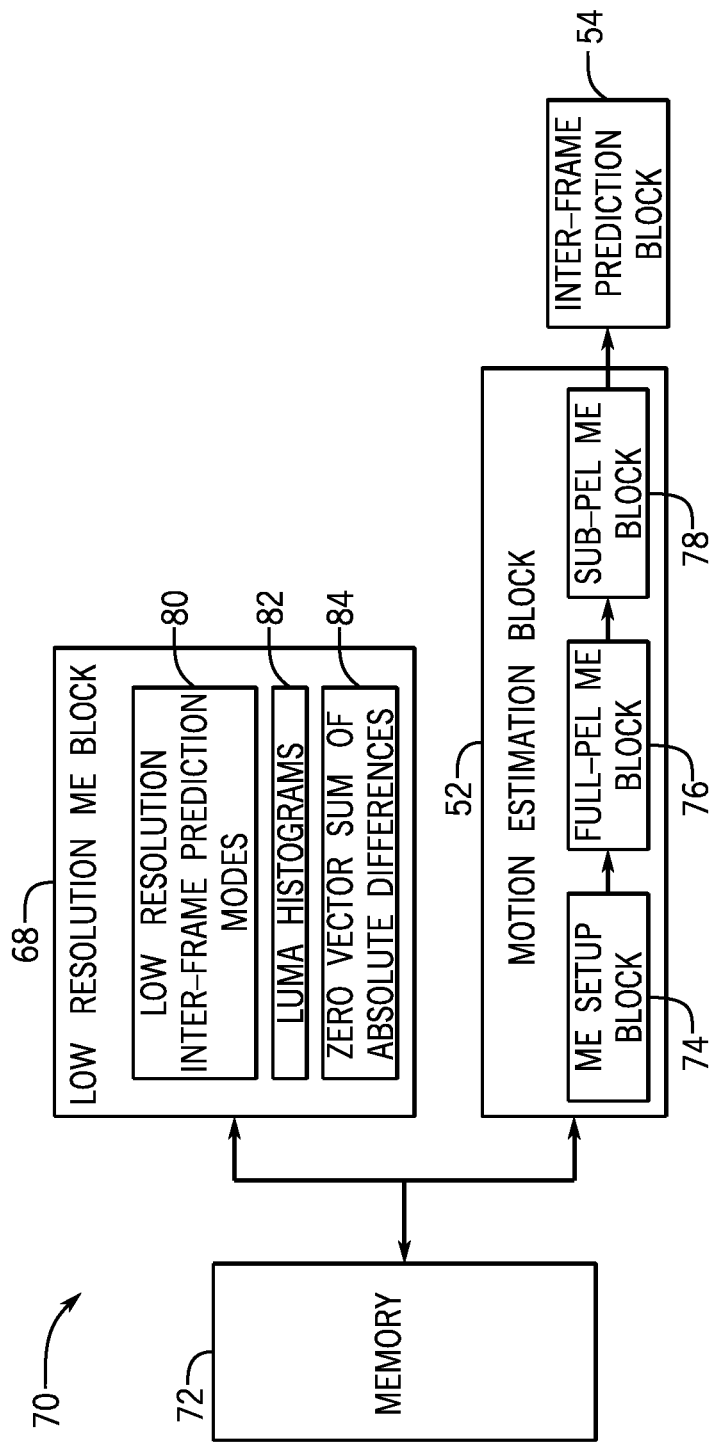
FIG. 7 is block diagram of a portion of the video encoding pipeline of FIG. 6 including a low resolution motion estimation block, in accordance with an embodiment.

To help illustrate, a portion 70 of the video encoding pipeline 34 including the low resolution motion estimation block 68, the motion estimation block 52, the inter-frame prediction block 54, and video encoding pipeline memory 72 is described in FIG. 7. With regard to the depicted embodiment, video encoding pipeline memory 72 is intended to represent a tangible, non-transitory, computer-readable medium that may be accessed by the video encoding pipeline 34 to store data and/or retrieve data, such as image data or statistics. Accordingly, in some embodiments, the video encoding pipeline memory 72 may be included in the controller memory 44, the local memory 20, or the main memory storage device 22. In other embodiments, the video encoding pipeline memory 72 may be a separate storage component dedicated to the video encoding pipeline 34.

As depicted, the video encoding pipeline memory 72 is communicatively coupled to the low resolution motion estimation block 68 and the motion estimation block 52 in the main pipeline 48. In some embodiments, the video encoding pipeline memory 72 may provide direct memory access (DMA) that enables the low resolution motion estimation block 68 and the main pipeline 48 to access the video encoding pipeline memory 72 relative independently. Thus, in such embodiments, the low resolution motion estimation block 68 may process image frames in advance of the main pipeline 48, which may enable the low resolution motion estimation block 68 to determine information (e.g., low resolution candidate inter-frame prediction modes and/or statistics) useful for the main pipeline 48, particularly the motion estimation block 52 and the mode decision block 58.

As described above, the motion estimation block 52 may determine candidate inter-frame prediction modes (e.g., motion vector and reference index) used by the inter-frame prediction block 54 to determine a luma prediction sample. To facilitate determining the candidate inter-frame prediction modes, the motion estimation block 52 may include a motion estimation (ME) setup block 74, a full-pel motion estimation (ME) block 76, and a sub-pel motion estimation (ME) block 78. The term "full-pel" refers to full-pixel consideration while the term "sub-pel" refers to sub-pixel consideration. In other words, the full-pel motion estimation block 76 may determine reference samples at integer pixel locations and the sub-pel motion estimation block 78 may determine reference samples at fractional pixel locations.

In the depicted embodiment, the motion estimation setup block 74 may initialize the motion estimation block 52 with candidate inter-frame prediction modes. In the some embodiments, the motion estimation setup block 74 may identify inter-frame prediction modes selected for other prediction units as candidates. For example, the candidates may include inter-frame prediction modes selected for one or more neighbor prediction units in the same image frame and/or one or more co-located prediction units in other image frames. Additionally, the candidates may include automatically considered inter-frame prediction modes and/or controller-generated inter-frame prediction modes. The motion estimation setup block 74 may then input the candidate inter-frame prediction modes to the full-pel motion estimation block 76.

Based on these candidate inter-frame prediction modes, the full-pel motion estimation block 76 may search a pixel area (e.g., +/−3) around a pixel indicated by a candidate inter-frame prediction mode to determine a reference sample. More specifically, the full-pel motion estimation block 76 may select a luma reference sample within the pixel area that is similar to a current luma prediction block. In some embodiments, the full-pel motion estimation block 76 may determine how close the match based on a match metric, such as a sum of absolute difference (SAD) between the luma prediction block and the luma reference sample. Additionally, the full-pel motion estimation block 76 may determine estimated rate (e.g., number of bits) expected to be used to indicate the motion vector in the candidate inter-frame prediction mode (e.g., a motion vector difference).

The full-pel motion estimation block 76 then may sort the candidate inter-frame prediction modes by comparing associated motion vector cost. In some embodiments, the motion vector cost may be as follows:

$$\text{cost}_{MV} = C(\text{rate}_{MV}) + B(\text{match}) \tag{2}$$

where $\text{cost}_{MV}$ is the motion vector cost associated with a candidate inter-frame prediction mode, $\text{rate}_{MV}$ is estimated rate of the motion vector in the candidate inter-frame prediction mode, match is a match metric (e.g., sum of absolute difference) between a luma prediction block and a luma reference sample determined for the candidate inter-frame prediction mode, C is a weighting factor for the estimated rate of the motion vector, and D is a weighting factor for the match metric. The full-pel motion estimation block 76 may then input a number of candidate inter-frame prediction modes with the lowest associated motion vector costs to the sub-pel motion estimation block 78.

Based on these candidate inter-frame prediction modes, the sub-pel motion estimation block 78 may search a sub-pixel area (e.g., +/-0.5 pixels) around a pixel indicated by a candidate inter-frame prediction mode to determine a reference sample. Similar to the full-pel motion estimation block 76, the sub-pel motion estimation block 78 may select a luma reference sample within the search area that is similar to the current luma prediction block. In some embodiments, the sub-pel motion estimation block 78 may determine how close the match based on a match metric, such as a sum of absolute transformed difference (SATD) between the luma prediction block and the luma reference sample.

Additionally, similar the full-pel motion estimation block 76, the sub-pel motion estimation block 78 may sort the candidate inter-frame prediction modes by comparing associated motion vector cost. As described above, in some embodiments, the motion vector cost of each candidate inter-frame prediction mode may be determined using equation (2). The sub-pel motion estimation block 78 may then input a number of candidate inter-frame prediction modes with the lowest associated motion vector costs to the inter-frame prediction block 54 for determination of luma prediction samples.

As described above, the low resolution motion estimation block 68 may facilitate improving operational efficiency of the motion estimation block by determining low resolution inter-frame prediction modes 80. As will be described in more detail below, the low resolution motion estimation block 68 may downscale source image data and perform a motion estimation search on previously downscaled source image data to determine low resolution reference samples and corresponding low resolution inter-frame prediction modes 80 (e.g., motion vector and reference index).

Since downscaled image data may be relatively similar to full resolution image data, a low resolution inter-frame prediction mode 80 may indicate likely location of a full resolution reference sample. As such, the low resolution inter-frame prediction modes 80 may be input to the motion estimation setup block 74 and used as a candidate inter-frame prediction mode. As such, using low resolution inter-frame prediction modes 80 as candidates may improve operational efficiency of the motion estimation block 52, which may facilitate real-time or near real-time transmission and/or display of image data.

Additionally, since the motion estimation search is performed on downscaled source image data instead of reconstructed image data and the low resolution motion estimation block 68 is in a separate pipeline, operational timing of the low resolution motion estimation block 68 may be relatively independent from operational timing of the main pipeline 48. In some embodiments, this may enable the low resolution motion estimation block 68 to process image frames before they are even input to the main pipeline 48. In such embodiments, the low resolution motion estimation block 68 may determine, in advance, statistics for the image data that may be used to improve operational efficiency of the main pipeline 48.

For example, the low resolution motion estimation block 68 may determine luma histograms 82 and/or zero vector sum of absolute differences (SADs) 84, which may be used to determine when a scene change is expected to occur. Since premised on similarity between successively displayed image frames, inter-frame prediction techniques may be less effective across a scene change. Thus, when detected, the low resolution motion estimation block 68 may indicate a scene change to the mode decision block 58 so that the mode decision block 58 may select a candidate intra-frame prediction mode or a skip mode. In some embodiments, this may enable disabling the motion estimation block 52 since it determines candidate inter-frame prediction modes, which are not considered.

Additionally, determining when scene changes are expected to occur ahead of time may facilitate frame-rate conversion. Image data may be captured (e.g., by an image sensor 13) as image frames at a capture rate and displayed (e.g., on an electronic display 12) as image frames at a display refresh rate. In some embodiments, the capture rate and the display refresh rate may be different. As such, frame-rate conversion may be used to convert between the capture rate and the display refresh rate. To facilitate conversion, interpolation between multiple image frames may be used. However, image frames across a scene change may vary drastically. As such, interpolating image frames a scene change may create a noticeably distorted image. Thus, when a scene change is expected to occur, the main pipeline 48 may cease interpolating and instead use other techniques, such as repeating an image frame.

Furthermore, statistics determined by the low resolution motion estimation block 68 may facilitate image stabilization. In some embodiments, the low resolution motion estimation block 68 may determine similar portions of successively displayed image frames to determine trends in motion, for example, as global motion vectors. Based on the motion trends, successively displayed image frames may be stabilized. In this manner, the low resolution motion estimation block 68 may determine statistics useful for improving operational efficiency of the main pipeline 48, which may facilitate real-time or near real-time transmission and/or display of image data.

Figure 8:
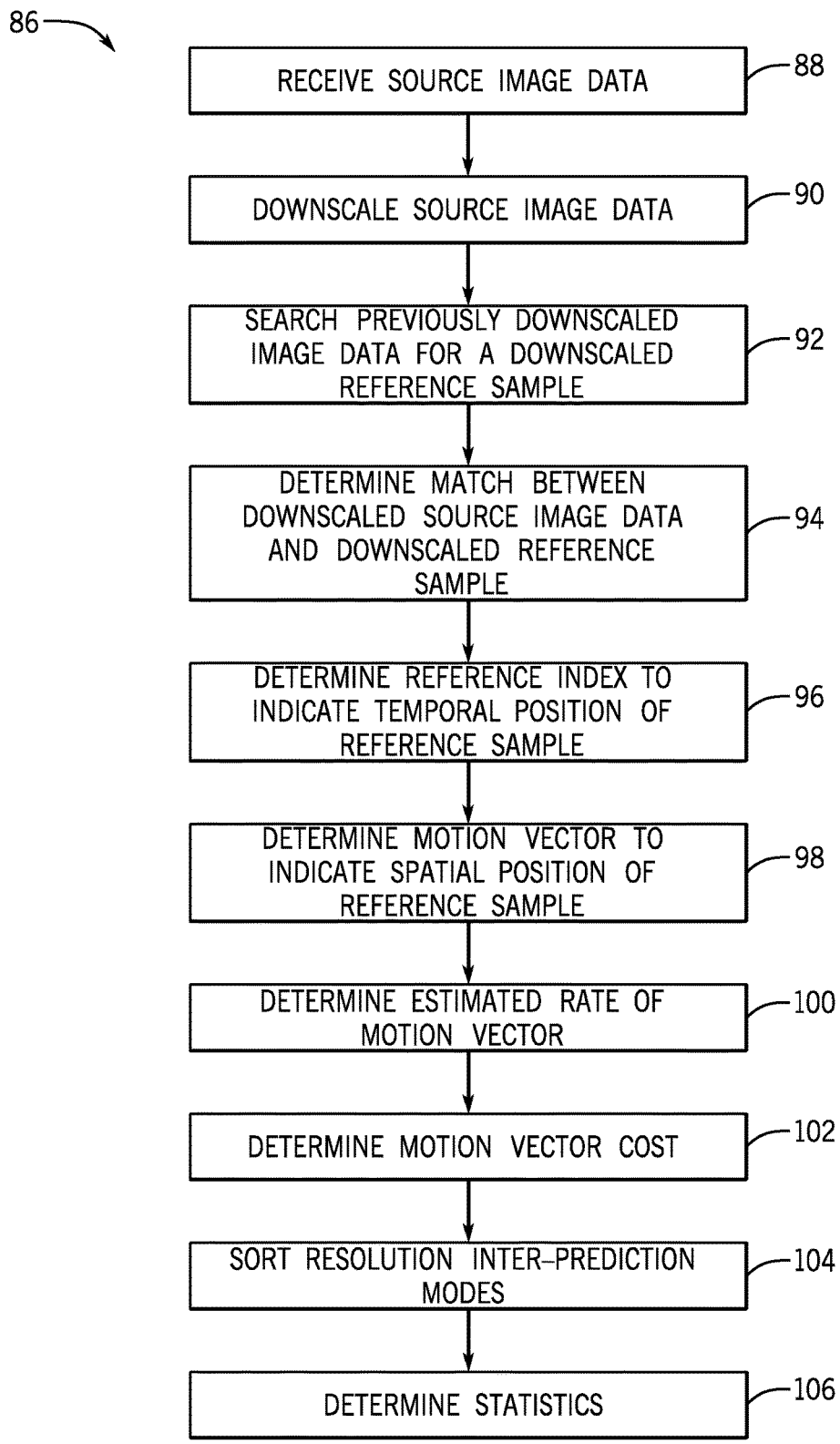
FIG. 8 is a flow diagram of a process for operating the low resolution motion estimation block of FIG. 7, in accordance with an embodiment.

To help illustrate, one embodiment of a process 86 for operating the low resolution motion estimation block 68 is described in FIG. 8. Generally, the process 86 includes receiving source image data (process block 88), downscaling the source image data (process block 90), searching previously downscaled image data for a downscaled reference sample (process block 92 determining match between the downscaled image data and the downscaled reference sample (process block 94), determining a reference index to indicate temporal position of a reference sample, (process block 96), determining a motion vector to indicate spatial position of the reference sample (process block 98), determining an estimated rate of the motion vector (process block 100), determining a motion vector cost (process block 102), sort one or more low resolution inter-frame prediction modes (process block 104), and determining statistics (process block 106). In some embodiments, the process 86 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the low resolution motion estimation block 68 to receive source image data (process block 88). For example, the low resolution motion estimation block 68 may retrieve source image data from the video encoding pipeline memory 72 using direct memory access (DMA). Additionally, as described above, source image data for an image frame may be divided into coding units, which is each successively encoded in the main pipeline 48. Thus, in such embodiments, the low resolution motion estimation block 68 may receive a coding unit of source image data, which includes a luma coding block and two chroma coding blocks. It should be appreciated that, while certain examples of particular coding units, prediction units, and transform units are described below, any suitable block sizes may be used. For example, while 16×16 or 32×32 coding units, prediction units, and transform units are discussed below, other sizes may be 64×64 or 128×128 or greater. Moreover, while the coding units, prediction units, and transform units are described as squares, other geometries may be used. For example, in other embodiments, the coding units, prediction units, and transform units may be 16×32 or 128×64.

The controller 40 may then instruct the low resolution motion estimation block 68 to reduce resolution by downscaling the source image data (process block 90) and storing the downscaled source image data, for example, in the video encoding pipeline memory 72. In some embodiments, the low resolution motion estimation block 68 may downscale resolution of a 64×64 coding unit by one-sixteenth (e.g., one-fourth vertically and one-fourth horizontally) resulting in a 16×16 downscaled coding unit, which includes a 16×16 downscaled luma coding block. Additionally, the low resolution motion estimation block 68 may store a copy of the downscaled source image data, for example, in the video encoding pipeline memory 72 using direct memory access (DMA), to facilitate performing low resolution motion estimation searches for subsequently received coding units. It should be appreciated that, while direct memory access may be used, the memory may be accessed in any other suitable way (e.g., non-DMA memory access).

Based on the downscaled source image data (e.g., downscaled version of source image data), the controller 40 may instruct the low resolution motion estimation block 68 to perform a low resolution motion estimation by searching previously downscaled source image data to determine one or more downscaled reference samples (process block 92). In some embodiments, the previously downscaled source image data may include downscaled image data corresponding to other image frames and, thus, may be retrieved from the video encoding pipeline memory 72. The low resolution motion estimation block 68 may search the previously encoded image data to determine downscaled reference samples that are similar to luma of the downscaled source image data. In some embodiments, the low resolution motion estimation block 68 may determine a match between the source image data and a downscaled reference sample based on a match metric, such as sum of absolute difference (SAD) between luma of the downscaled source image data and luma of the downscaled reference sample (process block 94).

As described above, a coding unit may include one or more luma prediction blocks, which is each encoded using the same prediction technique. Additionally, as described above, a coding unit may utilize various prediction mode configurations (e.g., number, size, location, and/or prediction modes for the one or more luma prediction blocks). Thus, in such embodiments, the low resolution motion estimation block 68 may determine one or more downscaled reference samples for variously sized downscaled luma prediction blocks in a downscaled coding unit.

Figure 9A:
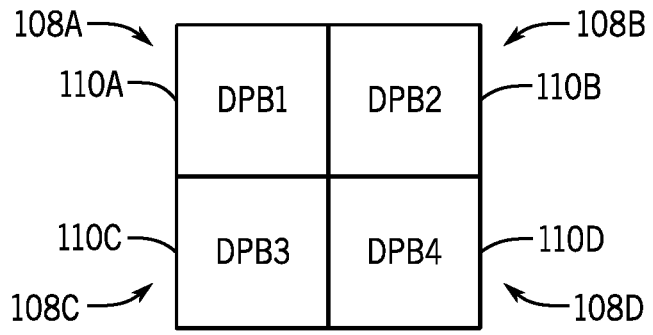
FIGS. 9A-D are diagrammatic representations of a downscaled coding unit subdivided into one or more downscaled luma prediction blocks, in accordance with an embodiment.

To help illustrate, a diagrammatic representation of downscaled coding units are described in FIGS. 9A-D. For the purpose of illustration, each downscaled coding unit is an 8×8 downscaled coding unit 108, which may be generated by downscaling a 32×32 coding unit by one-sixteenth resolution. As described above, each coding unit may include one or more luma prediction blocks. For example, a 32×32 coding unit may include a single 32×32 luma prediction block. Accordingly, a corresponding 8×8 downscaled coding unit 108 may include a single 8×8 downscaled luma prediction block 110. For example, as depicted in FIG. 9A, the first 8×8 downscaled coding unit 108A includes a first 8×8 downscaled luma prediction block (DPB1) 110A, the second 8×8 downscaled coding unit 108B includes a second 8×8 downscaled luma prediction block (DPB2) 110B, the third 8×8 downscaled coding unit 108C includes a third 8×8 downscaled luma prediction block (DPB3) 110C, and the fourth 8×8 downscaled coding unit 108D includes a fourth 8×8 downscaled luma prediction block (DPB4) 110D. By searching the previously downscaled image data, the low resolution motion estimation block 68 may then determine one or more downscaled reference samples for each of the 8×8 downscaled luma prediction blocks 110.

Figure 9B:
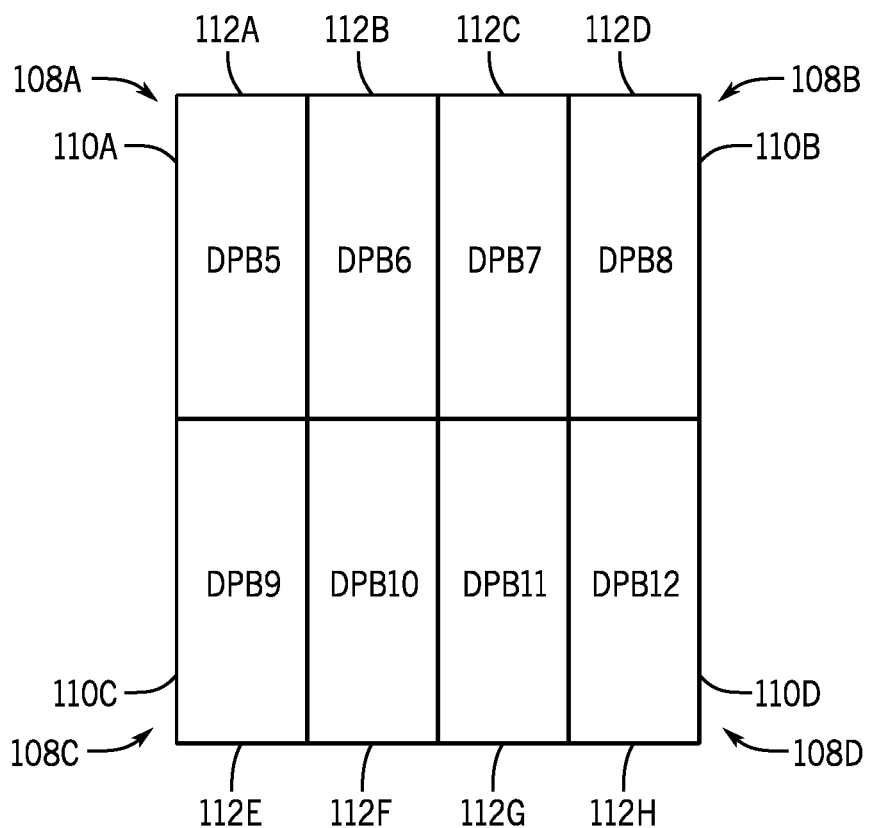

Additionally, a 32×32 coding unit may include two 32×16 luma prediction blocks. Thus, a corresponding 8×8 downscaled coding unit 108 may include two 8×4 downscaled luma prediction blocks 112. For example, as depicted in FIG. 9B, the first 8×8 downscaled coding unit 108A includes a first 8×4 downscaled luma prediction block (DPB5) 112A and a second 8×4 downscaled luma prediction block (DPB6) 112B, the second 8×8 downscaled coding unit 108B includes a third 8×4 downscaled luma prediction block (DPB7) 112C and a fourth 8×4 downscaled luma prediction block (DPB8) 112D, the third 8×8 downscaled coding unit 108C includes a fifth 8×4 downscaled luma prediction block (DPB9) 112E and a sixth 8×4 downscaled luma prediction block (DPB10) 112F, and the fourth 8×8 downscaled coding unit 108D includes a seventh 8×4 downscaled luma prediction block (DPB11) 112G and an eighth 8×4 downscaled luma prediction block (DPB12) 112H. By searching the previously downscaled image data, the low resolution motion estimation block 68 may then determine one or more downscaled reference samples for each of the 8×4 downscaled luma prediction blocks 112.

Figure 9C:
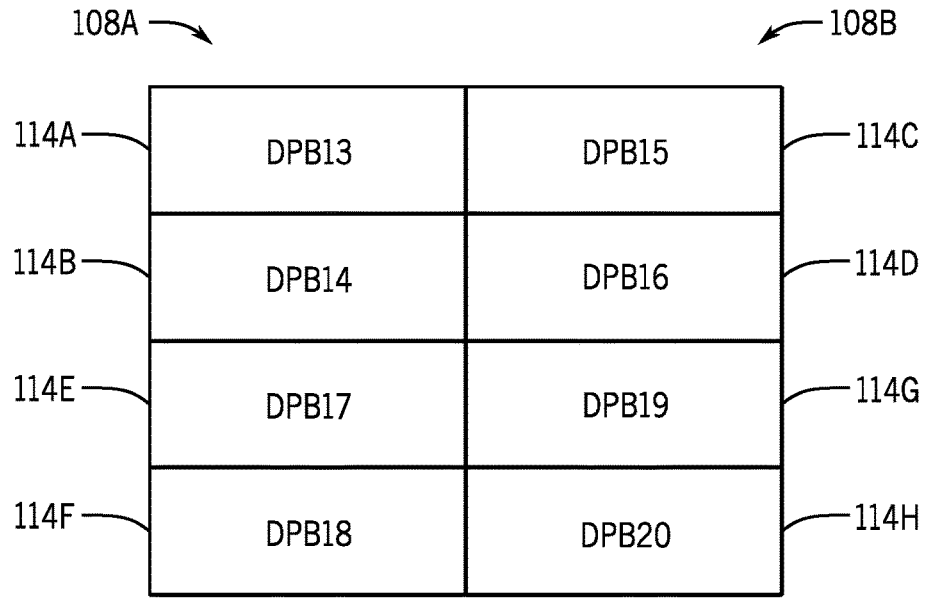

A 32×32 coding unit may also include two 16×32 luma prediction blocks. Thus, a corresponding 8×8 downscaled coding unit 108 may include two 4×8 luma prediction blocks 114. For example, as depicted in FIG. 9C, the first 8×8 downscaled coding unit 108A includes a first 4×8 downscaled luma prediction block (DPB13) 114A and a second 4×8 downscaled luma prediction block (DPB14) 114B, the second 8×8 downscaled coding unit 108B includes a third 4×8 downscaled luma prediction block (DPB15) 114C and a fourth 4×8 downscaled luma prediction block (DPB16) 114D, the third 8×8 downscaled coding unit 108C includes a fifth 4×8 downscaled luma prediction block (DPB17) 114E and a sixth 4×8 downscaled luma prediction block (DPB18)

114F, and the fourth 8×8 downscaled coding unit 108D includes a seventh 4×8 downscaled luma prediction block (DPB19) 114G and an eighth 4×8 downscaled luma prediction block (DPB20) 114H. By searching the previously downscaled image data, the low resolution motion estimation block 68 may then determine one or more downscaled reference samples for each of the 4×8 downscaled luma prediction blocks 114.

Figure 9D:
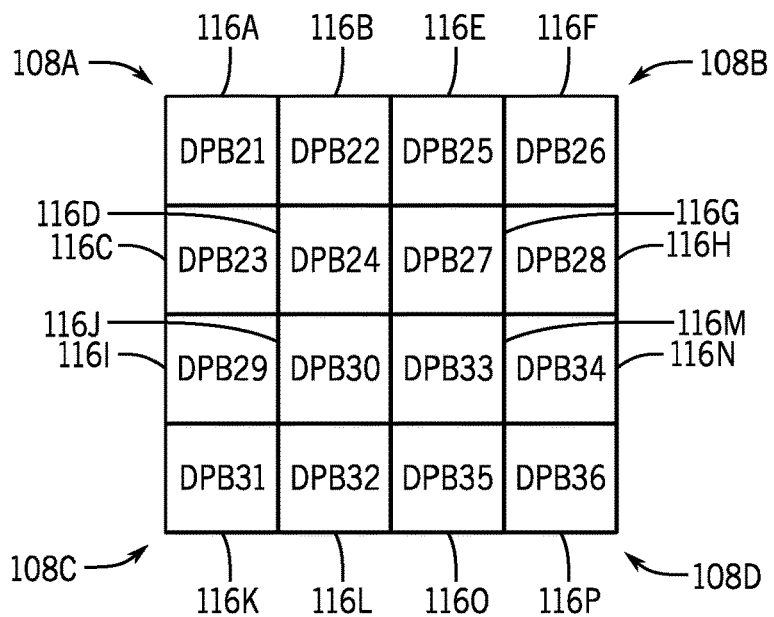

Furthermore, a 32×32 coding unit may also include four 16×16 luma prediction blocks. Thus, a corresponding 8×8 downscaled coding unit 108 may include four 4×4 luma prediction blocks 116. For example, as depicted in FIG. 9D, the first 8×8 downscaled coding unit 108A includes a first 4×4 downscaled luma prediction block (DPB21) 116A, a second 4×4 downscaled luma prediction block (DPB22) 116B, a third 4×4 downscaled luma prediction block (DPB23) 116C, and a fourth 4×4 downscaled luma prediction block (DPB24) 116D. The second 8×8 downscaled coding unit 108B includes a fifth 4×4 downscaled luma prediction block (DPB25) 116E, a sixth 4×4 downscaled luma prediction block (DPB26) 116F, a seventh 4×4 downscaled luma prediction block (DPB27) 116G, and an eighth 4×4 downscaled luma prediction block (DPB28) 116H. The third 8×8 downscaled coding unit 108C includes a ninth 4×4 downscaled luma prediction block (DPB29) 116I, a tenth 4×4 downscaled luma prediction block (DPB30) 116J, an eleventh 4×4 downscaled luma prediction block (DPB31) 116K, and a twelfth 4×4 downscaled luma prediction block (DPB32) 116L. The fourth 8×8 downscaled coding unit 108D includes a thirteenth 4×4 downscaled luma prediction block (DPB33) 116M, a fourteenth 4×4 downscaled luma prediction block (DPB35) 116N, an fifteenth 4×4 downscaled luma prediction block (DPB35) 116M, and a sixteenth 4×4 downscaled luma prediction block (DPB36) 116P. By searching the previously downscaled image data, the low resolution motion estimation block 68 may then determine one or more downscaled reference samples for each of the 4×4 downscaled luma prediction blocks 116.

Returning to the process 86 described in FIG. 8, the controller 40 may instruct the low resolution motion estimation block 68 to determine a reference index to indicate position of a reference image frame containing one or more of the downscaled references samples (process block 96). As described above, a reference index may indicate temporal position of the reference image frame. In some embodiments, the reference index may indicate display order of the reference image frame relative to a current image frame (e.g., image frame corresponding with received source image data), for example, number of image frames before or after the current image frame.

Additionally, the controller 40 may instruct the low resolution motion estimation block 68 to determine motion vectors for one or more downscaled reference samples (process block 98). As described above, a motion vector may indicate spatial position of a reference sample in the reference image frame relative to a prediction unit in the current image frame. Accordingly, in some embodiments, the low resolution motion estimation block 68 may determine a motion vector by determining a horizontal offset (e.g., mvX) and a vertical offset (e.g., mvY) between a prediction unit corresponding with the downscaled luma prediction block and a reference sample with a downscaled reference sample. In this manner, the low resolution motion estimation block 68 may determine one or more low resolution inter-frame prediction modes (e.g., motion vector and reference index).

Furthermore, the controller 40 may instruct the low resolution motion estimation block 68 to determine estimated rate of one or more motion vectors in the one or more low resolution inter-frame prediction modes (process block 100). As described above, the estimated rate may include number of bits expected to be used to indicate the motion vector. Thus, the estimated rate may depend at least in part on how the motion vector is expected to be indicated. In some embodiments, the motion vector may be transmitted as a motion vector difference, which indicates change in horizontal offset and change in vertical offset from a previously transmitted motion vector. In such embodiments, the estimated rate of the motion vector may be the number of bits expected to be used to transmit the motion vector difference.

The controller 40 may then instruct the low resolution motion estimation block 68 to determine a motion vector cost associated with one or more of the low resolution inter-frame prediction modes (process block 102). In some embodiments, the motion vector cost may be determined using equation (2). In such embodiments, the low resolution motion estimation block 68 may determine a motion vector cost for a low resolution inter-frame prediction mode based at least in part on its corresponding estimated rate and a match metric (e.g., sum of absolute difference between downscaled luma prediction block and downscaled reference sample).

Based on associated motion vector costs, the controller 40 may instruct the low resolution motion estimation block 68 to sort the one or more low resolution inter-frame prediction modes (process block 104). In some embodiments, the low resolution motion estimation block 68 may the one or more low resolution inter-frame prediction modes by comparing their associated motion vector costs. As described above, the low resolution motion estimation block 68 may output one or more of the low resolution inter-frame prediction modes for use as candidates in the motion estimation block 52. In some embodiments, the low resolution motion estimation block 68 may output a specific number of low resolution inter-frame prediction modes with the lowest associated motion vector costs in a specific order. Additionally, in some embodiments, the low resolution motion estimation block 68 may output the results to the video encoding pipeline memory 72 using one or more direct memory access (DMA) channels.

Figure 10:
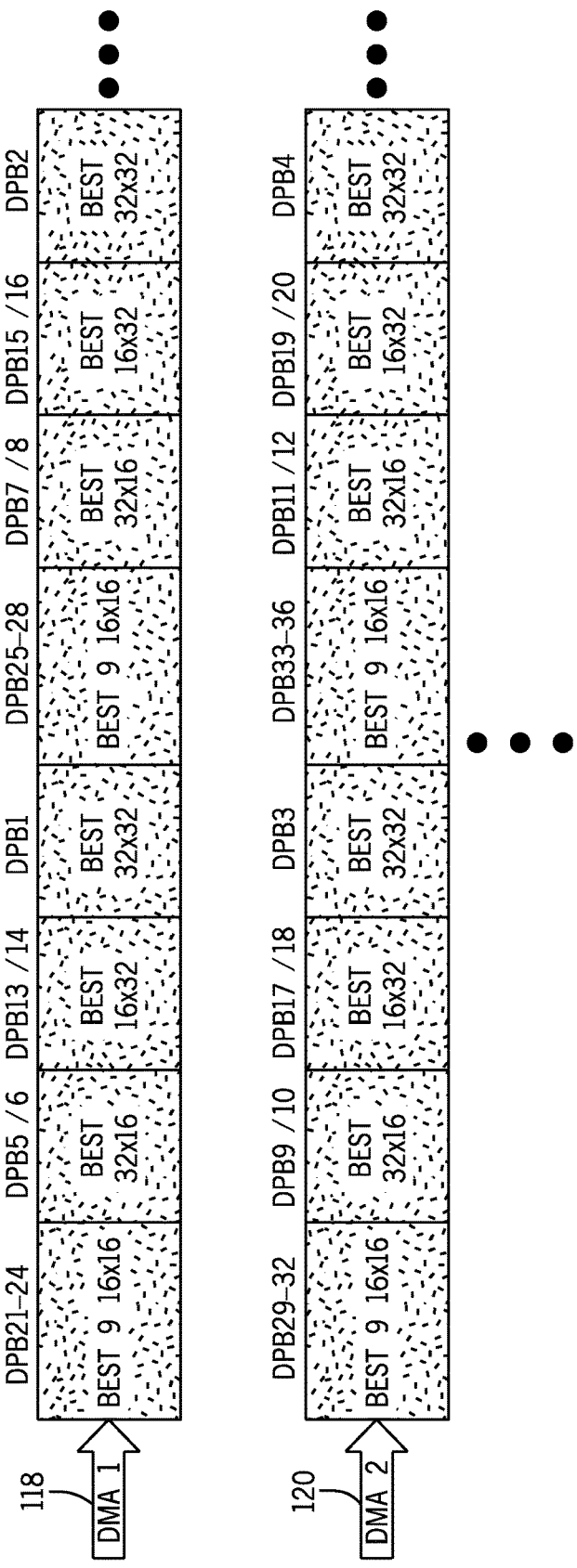
FIG. 10 is a diagrammatic representation of results output by the low resolution motion estimation block of FIG. 7, in accordance with an embodiment.

To help illustrate, a diagrammatic representation of example results output from the low resolution motion estimation block 68 is described in FIG. 10. In the depicted embodiment, the low resolution inter-frame prediction modes for each 8×8 downscaled coding unit 108 is output in row order. For example, the low resolution inter-frame prediction modes determined for the first 8×8 downscaled coding unit 108A are output followed by the low resolution inter-frame prediction modes determined for the second 8×8 downscaled coding unit 108B and so on down the first row of downscaled coding units 108. Similarly, the low resolution inter-frame prediction modes determined for the third 8×8 downscaled coding unit 108C are output followed by the low resolution inter-frame prediction modes determined for the fourth 8×8 downscaled coding unit 108D and so on down the second row of downscaled coding units 108.

Additionally, in some embodiments, the low resolution inter-frame prediction modes for each downscaled coding unit may be transmitted in a specific order. For example, in the depicted embodiment, one or more 16×16 low resolution inter-frame prediction modes determined for the 4×4 downscaled luma prediction blocks 116 may be transmitted followed by one or more 32×16 low resolution inter-frame prediction modes determined for the 8×4 downscaled luma prediction blocks 112 followed by one or more 16×32 low resolution inter-frame prediction modes determined for the 4×8 downscaled luma prediction blocks 114 followed by one or more 32×32 low resolution inter-frame prediction modes determined for an 8×8 downscaled luma prediction block 110. In some embodiments, the number of each type of low resolution inter-frame prediction mode output for each downscaled coding unit 108. For example, in the depicted embodiment, the low resolution inter-frame prediction modes include nine 16×16 low resolution inter-frame prediction modes, one 32×16 low resolution inter-frame prediction mode, one 16×32 low resolution inter-frame prediction modes, and one 32×32 low resolution inter-frame prediction mode.

It should be appreciated that, while certain examples of low resolution inter-frame prediction modes are described below, any suitable types of low resolution inter-frame prediction modes may be used. For example, while 16×16, 16×32, 32×16, and 32×32 low resolution inter-frame prediction modes are discussed, other types of types (e.g., 64×64 or 128×128) may be used.

Furthermore, in some embodiments, the low resolution inter-frame prediction modes for each row of downscaled coding units may be output using a separate direct memory access channel. For example, in the depicted embodiment, a first direct memory access channel 118 is used to output low resolution inter-frame prediction modes corresponding with downscaled coding units 108 in the first row. Additionally, a second direct memory access channel 120 is used to output low resolution inter-frame prediction modes corresponding with downscaled coding units 108 in the second row. Similarly, additional direct memory access channels may be used to output low resolution inter-frame prediction modes corresponding with other rows of downscaled coding units 108. As described above, direct memory access may enable the low resolution motion estimation block 68 to determine statistics useful for improving operational efficiency of the main pipeline 48.

Accordingly, returning to the process 86 described in FIG. 8, the controller 40 may instruct the low resolution motion estimation block 68 to determine statistics based at least in part on luma of the downscaled source image data (process block 106). In some embodiments, the statistics may include luma histograms 82 and/or zero vector sum of absolute differences for the downscaled source image data. As will be described in more detail below, the statistics may facilitate improving operational efficiency of the main pipeline 48, for example, by indicating when a scene change is expected to occur. As such, the mode decision block 58 may stop considering candidate inter-frame prediction modes and/or the motion estimation block 52 may stop determining candidate inter-frame prediction modes, thereby improving operational efficiency of the main pipeline 48. Additionally or alternatively, the statistics may be used by other portions of the computing device 10 and/or other external computing devices 10 (e.g., decoding computing device 10).

Figure 11:
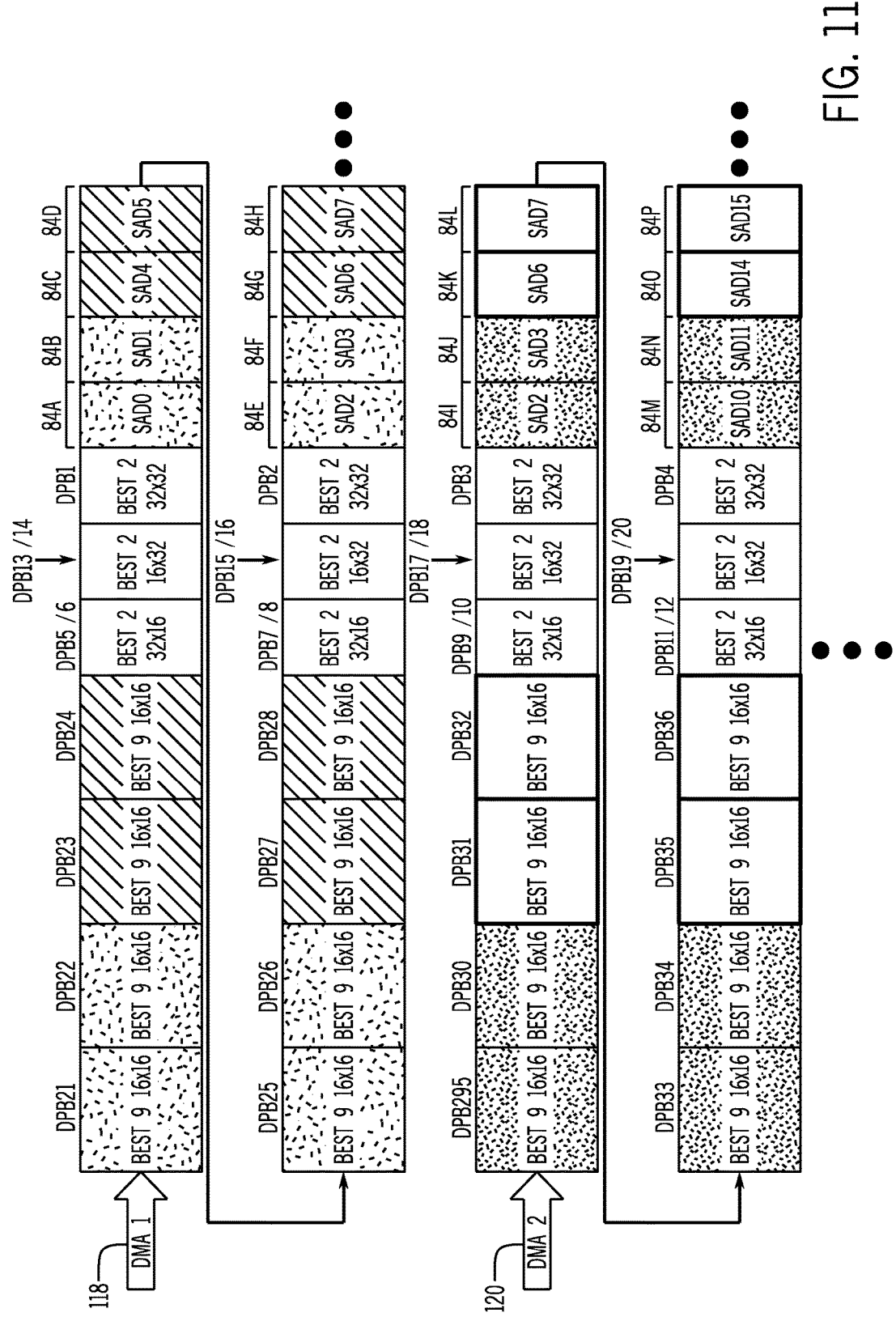
FIG. 11 is a diagrammatic representation of results output by the low resolution motion estimation block of FIG. 7, in accordance with an embodiment.

In some embodiments, some of the statistics determined by the low resolution motion estimation block 68 may be output along with the low resolution inter-frame prediction modes. To help illustrate, a diagrammatic representation of an example output from the low resolution motion estimation block 68 is described in FIG. 11. Similar to the previously described example, the low resolution results for each 8×8 downscaled coding unit 108 may be output in row order with each row utilizing a separate direct memory access channel. For example, in the depicted embodiments, the first direct memory access channel 118 outputs results determined for the first 8×8 downscaled coding unit 108A followed by results determined for the second 8×8 downscaled coding unit 108B and so on down the first row of downscaled coding units 108. Similarly, the second direct memory access channel 120 outputs results determined for the third 8×8 downscaled coding unit 108C followed by results determined for the fourth 8×8 downscaled coding unit 108D and so on down the second row of downscaled coding units 108. Additional direct memory access channels may be used to output low resolution inter-frame prediction modes corresponding with other rows of downscaled coding units 108.

As described above, in addition to the low resolution inter-frame prediction modes, the results determined by the low resolution motion estimation block 68 may include statistics, such as zero vector sum of absolute differences 84 determined for one or more downscaled luma prediction blocks. For example, in the depicted embodiment, the first direct memory access channel 118 outputs a first zero vector sum of absolute difference 84A determined for the first 4×4 downscaled luma prediction block 116A, a second zero vector sum of absolute difference 84B determined for the second 4×4 downscaled luma prediction block 116B, a third zero vector sum of absolute difference 84C determined for the third 4×4 downscaled luma prediction block 116C, a fourth zero vector sum of absolute difference 84D determined for the fourth 4×4 downscaled luma prediction block 116D, a fifth zero vector sum of absolute difference 84E determined for the fifth 4×4 downscaled luma prediction block 116E, a sixth zero vector sum of absolute difference 84F determined for the sixth 4×4 downscaled luma prediction block 116F, a seventh zero vector sum of absolute difference 84G determined for the seventh 4×4 downscaled luma prediction block 116G, and an eighth zero vector sum of absolute difference 84H determined for the eighth 4×4 downscaled luma prediction block 116H. Additionally, the second direct memory access channel 120 outputs a ninth zero vector sum of absolute difference 84I determined for the ninth 4×4 downscaled luma prediction block 116I, a tenth zero vector sum of absolute difference 84J determined for the tenth 4×4 downscaled luma prediction block 116J, a eleventh zero vector sum of absolute difference 84K determined for the eleventh 4×4 downscaled luma prediction block 116K, a twelfth zero vector sum of absolute difference 84L determined for the twelfth 4×4 downscaled luma prediction block 116L, a thirteenth zero vector sum of absolute difference 84M determined for the thirteenth 4×4 downscaled luma prediction block 116M, a fourteenth zero vector sum of absolute difference 84N determined for the fourteenth 4×4 downscaled luma prediction block 116N, a fifteenth zero vector sum of absolute difference 84O determined for the fifteenth 4×4 downscaled luma prediction block 116O, and an sixteenth zero vector sum of absolute difference 84P determined for the sixteenth 4×4 downscaled luma prediction block 116P.

As described above, the results for each downscaled coding unit may be transmitted in a specific order. In some embodiments, results (e.g., inter-frame prediction mode or statistics) determined for luma prediction blocks may be concatenated together. In the depicted embodiment, 16×16 low resolution inter-frame prediction modes determined for each 4×4 downscaled luma prediction blocks 116 in a downscaled coding unit 108 are concatenated together in raster scan order of the downscaled coding unit 108. For example, as depicted, nine 16×16 low resolution inter-frame prediction modes determined for the first 4×4 downscaled luma prediction block 116A are concatenated with nine 16×16 low resolution inter-frame prediction modes determined for the second 4×4 downscaled luma prediction block 116B, nine 16×16 low resolution inter-frame prediction modes determined for the third 4×4 downscaled luma prediction block 116C, and nine 16×16 low resolution inter-frame prediction modes determined for the fourth 4×4 downscaled luma prediction block 116D.

Additionally, in the depicted embodiment, the zero vector sum of absolute difference 84 determine for each 4×4 downscaled luma prediction blocks 116 are concatenated together in raster scan order of the downscaled coding unit 108. For example, as depicted, the first zero vector sum of absolute difference 84A is concatenated with the second zero vector sum of absolute difference 84B, the third zero vector sum of absolute difference 84C, and the fourth zero vector sum of absolute difference 84D. Thus, for each downscaled coding unit 108, the 16×16 low resolution inter-frame prediction modes concatenated together may be transmitted, followed by two 32×16 low resolution inter-frame prediction modes, followed by two 16×32 inter-frame prediction modes, followed by two 32×32 inter-frame prediction modes, and followed by the zero vector sum of absolute differences 84 concatenated together.

Figure 12:
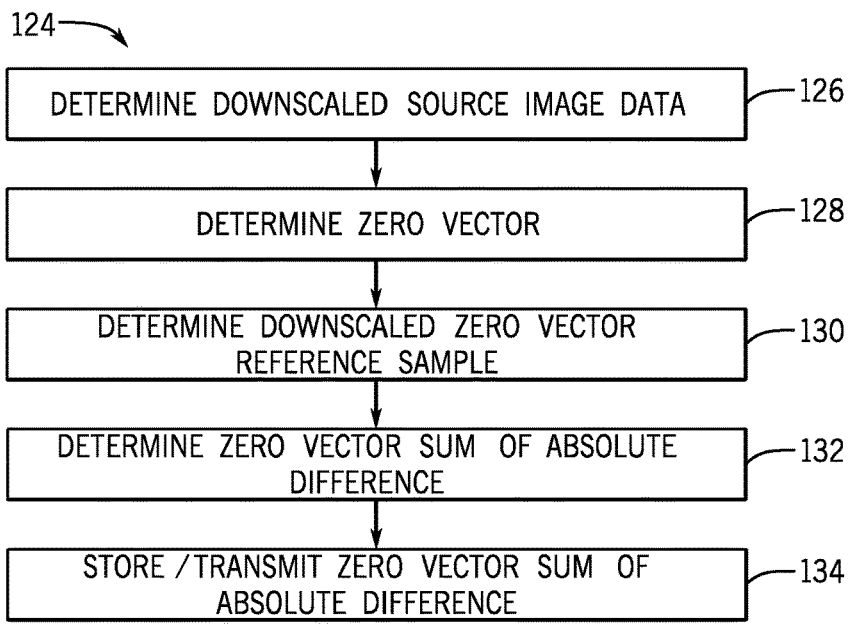
FIG. 12 is a flow diagram of a process for determining sum of absolute difference statistics using the low resolution motion estimation block of FIG. 7, in accordance with an embodiment.

One embodiment of a process 124 for determining a zero vector sum of absolute difference 84 statistic is described in FIG. 12. Generally, the process 124 includes determining downscaled source image data (process block 126), determining a zero vector (process block 128), determining a downscaled zero vector reference sample (process block 130), determining a zero vector sum of absolute different (process block 132), and storing/transmitting the zero vector sum of absolute difference (process block 134). In some embodiments, the process 124 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the low resolution motion estimation block 68 to determine downscaled source image data (process block 126). As described above, the low resolution motion estimation block 68 may determine the downscale source image data by reducing resolution of source image data received from the image data source 36. Additionally, as described above, in some embodiments, the downscaled source image data may be a downscaled coding unit, which includes one or more downscaled luma prediction block.

Additionally, the controller 40 may instruct the low resolution motion estimation block 68 to determine a zero vector (process block 128). As used herein, a "zero vector" is intended to describe a motion vector with zero horizontal and vertical offset. The controller 40 may then instruct the low resolution motion estimation block 68 to determine a downscaled zero vector reference sample using the zero vector (process block 130). In some embodiments, the downscaled zero vector reference sample may be a downscaled reference sample at the same location (e.g., co-located) as a downscaled luma prediction block, but in a different image frame.

Furthermore, the controller 40 may instruct the low resolution motion estimation block 68 to determine a zero vector sum of absolute difference 84 (process block 132). In some embodiments, the zero vector sum of absolute difference 84 may be the sum of absolute difference between the downscaled luma prediction block and the downscaled zero vector reference sample.

The controller 40 may then instruct the low resolution motion estimation block 68 to store and/or transmit the zero vector sum of absolute difference 84 (process block 134). In some embodiments, the low resolution motion estimation block 68 may store the zero vector sum of absolute difference 84 in the video encoding pipeline memory 72 using a direct memory access channel to enable the main pipeline 48 to retrieve the zero vector sum of absolute difference 84, for example, also using a direct memory access channel. As described above, the main pipeline 48 may use the zero vector sum of absolute difference 84 to improve operational efficiency, for example, by determining where a scene change is expected to occur and adjusting operation accordingly.

Figure 13:
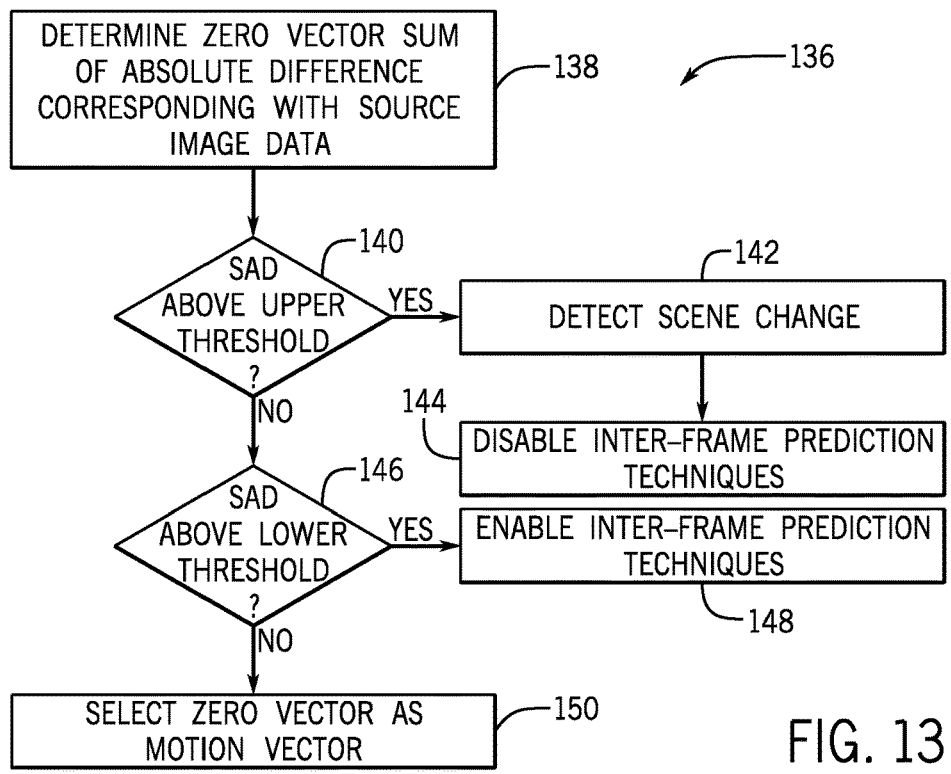
FIG. 13 is a flow diagram of a process for using the sum of absolute difference statistics in the video encoding pipeline of FIG. 6, in accordance with an embodiment.

To help illustrate, one embodiment of a process 136 for using a zero vector sum of absolute difference 84 is described in FIG. 13. Generally, the process 136 includes determining a zero vector sum of absolute difference corresponding with source image data (process block 138), determining whether the zero vector sum of absolute difference is above an upper SAD threshold (decision block 140), and, when above the upper SAD threshold, detecting a scene change (process block 142) and disabling inter-frame prediction techniques (process block 144). When not above the upper SAD threshold, the process 136 includes determining whether the zero vector sum of absolute difference is above a lower SAD threshold (decision block 146), enabling inter-frame prediction modes when above the lower SAD threshold (process block 148), and selecting zero vector as motion vector when not above the lower SAD threshold (process block 150). In some embodiments, the process 136 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the main pipeline 48 to determine a zero vector sum of absolute difference 84 corresponding with source image data (process block 138). In some embodiments, the zero vector sum of absolute difference 84 may be stored in the video encoding pipeline memory 72. Thus, the main pipeline 48 may retrieve the zero vector sum of absolute difference 84 from the video encoding pipeline memory 72 (e.g., via direct memory access) when corresponding source image data is received.

Additionally, in some embodiments, the zero vector sum of absolute difference 84 may be stored with the low resolution inter-frame prediction modes. Thus, in such embodiments, the zero vector sum of absolute difference 84 may be automatically retrieved when low resolution inter-frame prediction modes and retrieved. The main pipeline 48 may then separate the zero vector sum of absolute differences 84 from the low resolution inter-frame prediction modes.

Furthermore, the controller 40 may instruct the main pipeline 48 to determine whether the zero vector sum of absolute difference 84 is above an upper SAD threshold (decision block 140). In some embodiments, the upper SAD threshold may be predetermined and stored in the video encoding pipeline memory 72. As such, the main pipeline 48 may retrieve the upper SAD threshold and compare it with the zero vector sum of absolute differences 84.

As described above, the zero vector sum of absolute difference 84 is determined based on the difference between a downscaled luma prediction block and a downscaled zero vector reference sample. As such, the zero vector sum of absolute difference 84 may also indicate likely difference between a luma prediction block of the source image data corresponding with the downscaled luma prediction block and a zero vector reference sample corresponding with the low resolution zero vector reference sample. In other words, the larger the zero vector sum of absolute difference 84, the more the luma prediction block and the zero vector sample are expected to differ.

In some embodiments, the upper SAD threshold may be set such that values greater than the upper SAD threshold indicates that a large difference between the luma prediction block and the zero vector sample is expected. Thus, when the zero vector sum of absolute difference 84 is above the upper SAD threshold, the controller 40 may instruct the main pipeline 48 to determine that a scene change is expected to occur (process block 142). Since inter-frame prediction modes are premised on similarity between image frames, the controller 40 may instruct the main pipeline 48 to disable inter-frame prediction techniques (process block 144). As such, the mode decision block 58 may evaluate only candidate intra-frame prediction modes and/or skip modes.

On the other hand, when not above the upper SAD threshold, the controller 40 may instruct the main pipeline 48 to determine whether the zero vector sum of absolute difference 84 is above a lower SAD threshold (decision block 146). In some embodiments, the lower SAD threshold may be predetermined and stored in the video encoding pipeline memory 72. As such, the main pipeline 48 may retrieve the lower SAD threshold and compare it with the zero vector sum of absolute differences 84.

In some embodiments, the lower SAD threshold may be set such that values not greater than the lower SAD threshold are quite similar, if not identical. As such, when the zero vector sum of absolute difference 84 is not above the lower SAD threshold, the controller 40 may instruct the main pipeline 48 to consider a zero vector inter-frame prediction mode (e.g., zero vector and reference index). On the other hand, when greater than the lower SAD threshold, enough similarities in the image frames are expected to be present to enable inter-frame prediction techniques. Thus, when the zero vector sum of absolute difference 84 is above the lower SAD threshold, the controller 40 may instruct the main pipeline 48 to enable inter-frame prediction techniques (process block 148). As such, the mode decision block 58 may evaluate candidate intra-frame prediction modes as well as candidate inter-frame prediction modes and/or skip modes.

In addition to zero vector sum of absolute difference 84 statistics, the low resolution motion estimation block 68 may determine luma histogram 82 statistics. To help illustrate, one embodiment of a process 152 for determining luma histograms 82 is described in FIG. 14. Generally, the process 152 includes determining luma values of downscaled source image data (process block 154), determining a luma histogram (process block 156), and storing/transmitting the luma histogram (process block 158). In some embodiments, the process 152 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the low resolution motion estimation block 68 to determine luma values of downscaled source image data (process block 154). As described above, in some embodiments, the source image data may be a coding unit, which includes a downscaled luma coding block and one or more downscaled luma prediction blocks. Based at least in part on the downscaled luma coding block, the low resolution motion estimation block 68 may determine luma values for the luma coding block and/or one or more luma prediction blocks.

The controller 40 may then instruct the low resolution motion estimation block 68 to determine a luma histogram 82 based on the luma values of the downscaled source image data (process block 156). In some embodiments, the low resolution motion estimation block 68 may generate the luma histogram 82 to indicate number of pixels in the downscaled image data at each possible luma value (e.g., 0-255). In other embodiments, the luma histogram may indicate number of pixels in different ranges of possible luma values.

Figure 15:
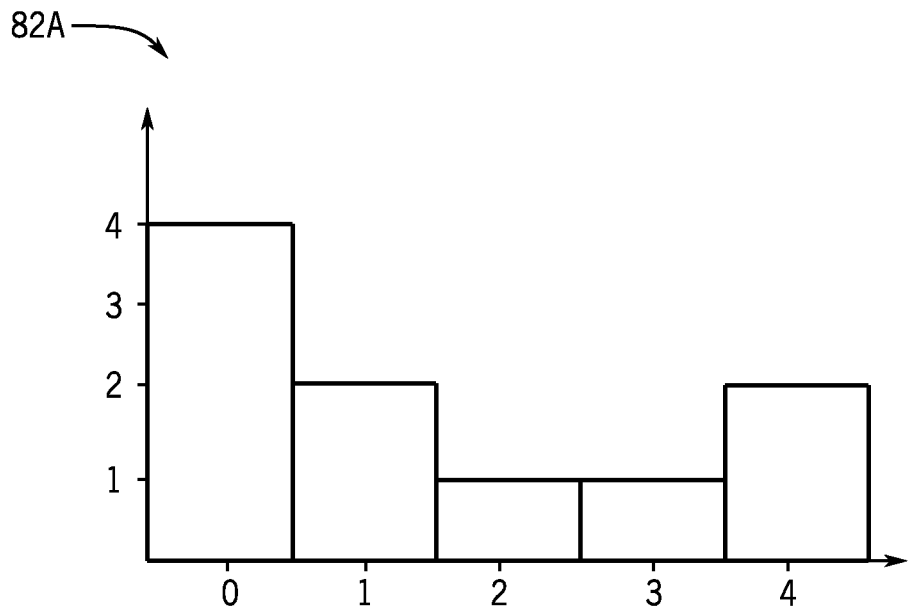
FIG. 15 is an example luma histogram corresponding with a first downscaled coding unit, in accordance with an embodiment.

To help illustrate, an example of a first luma histogram 82A is described in FIG. 15. In the depicted embodiment, the first luma histogram 82A is a plot that indicates possible luma values on its x-axis and number of pixels at each luma value on its y-axis. For the purpose of illustration, the first luma histogram 82A is determined for downscaled source image data including ten luma values, which can each have a value of zero, one, two, three, or four. In the depicted embodiment, the first luma histogram indicates that four pixels have a luma value of zero, two pixels have a luma value of one, one pixel has a luma value of two, one pixel has a luma value of three, and two pixels have a luma value of four.

Figure 14:
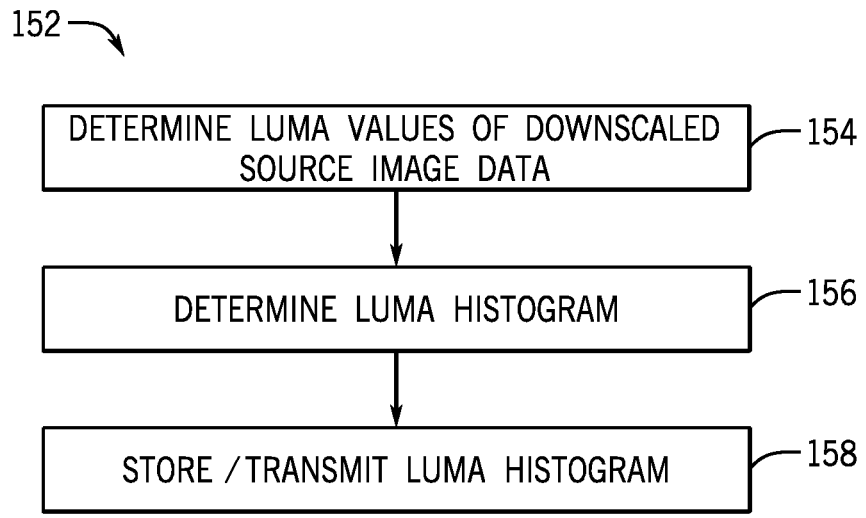
FIG. 14 is a flow diagram of a process for determining a luma histogram statistics using the low resolution motion estimation block of FIG. 7, in accordance with an embodiment.

Returning to the process 152 described in FIG. 14, the controller 40 may instruct the low resolution motion estimation block 68 to store and/or transmit the luma histogram 82 (process block 158). In some embodiments, the low resolution motion estimation block 68 may store the luma histogram 82 in the video encoding pipeline memory 72 using a direct memory access channel to enable the main pipeline 48 to retrieve the luma histogram 82, for example, using a direct memory access channel. As described above, the main pipeline 48 may use the luma histogram 82 to improve operational efficiency, for example, by determining where a scene change is expected to occur and adjusting operation accordingly.

Figure 16:
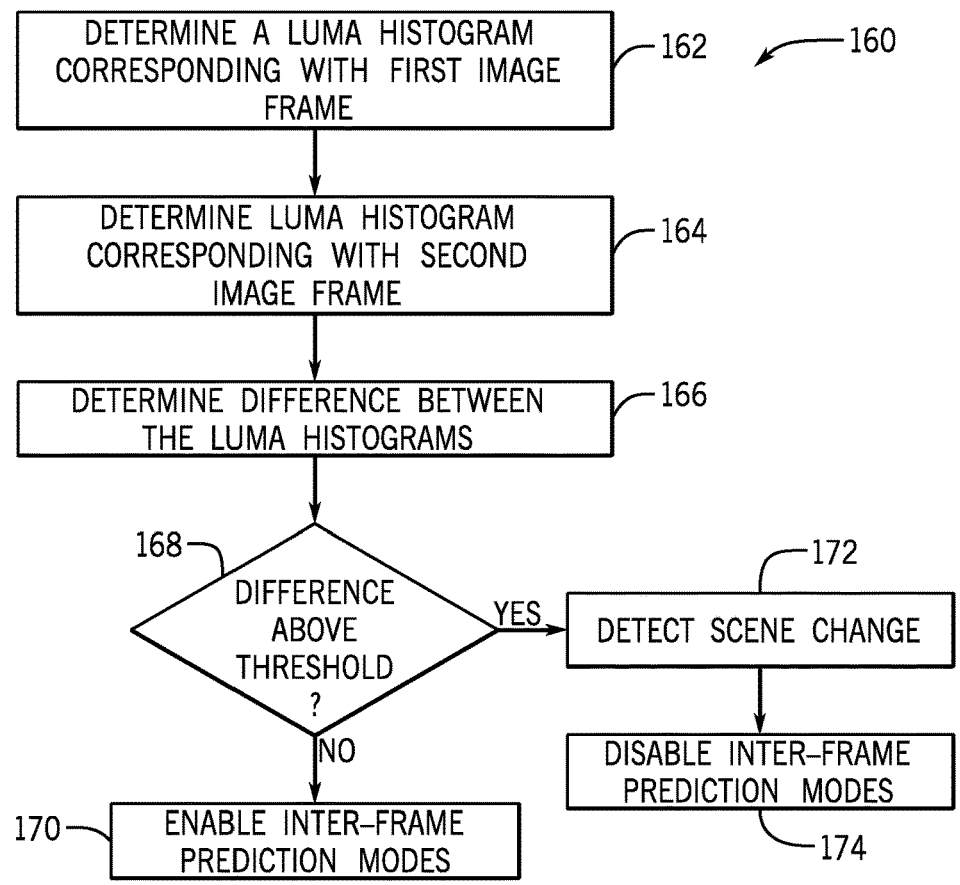
FIG. 16 is a flow diagram of a process for using luma histogram statistics in the video encoding pipeline of FIG. 6, in accordance with an embodiment.

To help illustrate, a process 160 for utilizing luma histograms 82 is described in FIG. 16. Generally, the process 160 includes determining a luma histogram corresponding with a first image frame (process block 162), determining a luma histogram corresponding with a second image frame (process block 164), determining difference between the luma histograms (process block 166), determining whether the difference is above a histogram threshold (decision block 168), when not above the histogram threshold, enabling inter-frame prediction modes (process block 170), and, when above the histogram threshold, detecting a scene change (process block 172) and disabling inter-frame prediction modes (process block 174). In some embodiments, the process 160 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the main pipeline 48 to determine a luma histogram 82 corresponding with a first image frame (process block 162). In some embodiments, luma histograms 82 may be stored in the video encoding pipeline memory 72. Thus, the main pipeline 48 may retrieve the luma histogram 82 corresponding with the first image frame from the video encoding pipeline memory 72 (e.g., via direct memory access) when source image data corresponding the first image frame is received.

The controller 40 may also instruct the main pipeline 48 to determine a luma histogram corresponding with a second image frame (process block 164). Similarly, the main pipeline 48 may retrieve the luma histogram 82 corresponding with the second image frame from the video encoding pipeline memory 72 (e.g., via direct memory access) when corresponding image data is received. In some embodiments, the second image frame may be referenced by an inter-frame prediction mode to indicate the first image frame. For example, the second image frame may be displayed directly before or directly after the first image frame. Additionally, the luma histograms may be for the co-located portions of the first image frame and the second image frame.

The controller 40 may then instruct the main pipeline 48 to determine a difference between the luma histogram corresponding with the first image frame and the luma histogram corresponding with the second image frame (process block 166). In some embodiments, the difference may be indicated by a difference metric that factors in number of pixels with different luma values and/or amount the luma values vary. To help illustrate, the luma histogram corresponding with the first image frame may be the first luma histogram 82A. Additionally, the second luma histogram corresponding with the second image frame may be a second luma histogram 82B described in FIG. 17 or a third luma histogram 82C described in FIG. 18. Similar to the first luma histogram 82A, the second luma histogram 82B and the third luma histogram 82C are each plots that indicates possible luma values on its x-axis and number of pixels at each luma value on its y-axis.

Figure 17:
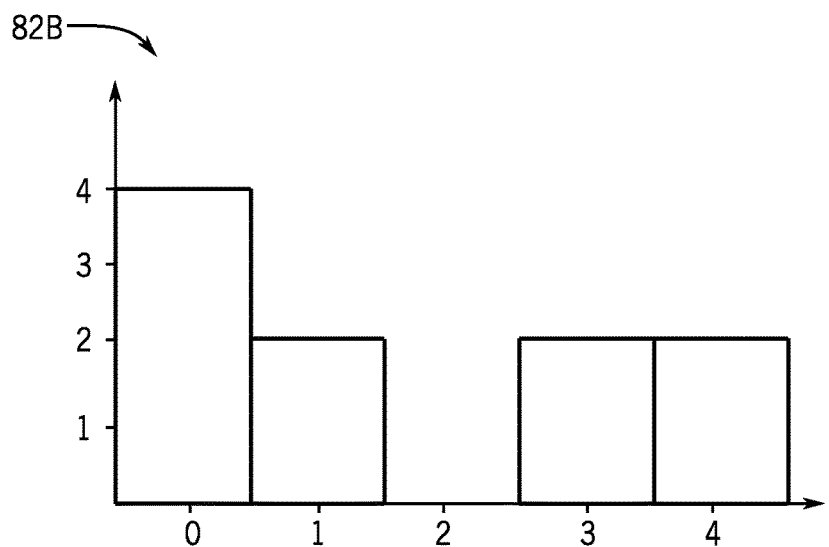
FIG. 17 is an example luma histogram corresponding with a second downscaled coding unit, in accordance with an embodiment.

As depicted in FIG. 17, the second luma histogram 82B indicates that four pixels have a luma value of zero, two pixels have a luma value of one, zero pixels have a luma value of two, two pixels has a luma value of three, and two pixels have a luma value of four. As such, the main pipeline 48 may determine that the first luma histogram 82A and the second luma histogram 82B have one pixel that varies in luma value. In such instances, the main pipeline 48 may determine that the downscaled source image data corresponding with the first luma histogram 82A and the second luma histogram 82B closely match and, thus, corresponding source image data is expected to closely match.

Figure 18:
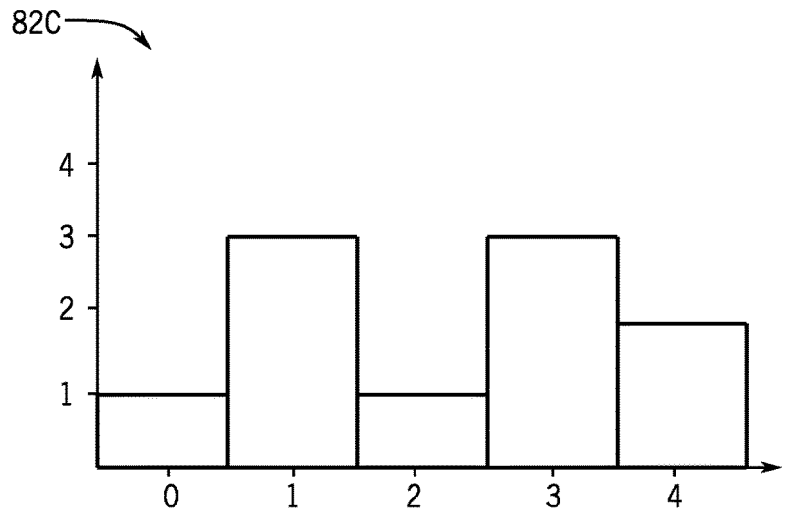
FIG. 18 is an example luma histogram corresponding with a third downscaled coding unit, in accordance with an embodiment.

On the other hand, as depicted in FIG. 18, the third luma histogram 82C indicates that one pixel has a luma value of zero, three pixels have a luma value of one, one pixel has a luma value of two, three pixels have a luma value of three, and two pixels have a luma value of four. As such, the main pipeline 48 may determine that the first luma histogram 82A and the third luma histogram 82C have six pixels that vary in luma value. In such instances, the main pipeline 48 may determine that downscaled source image data corresponding with the first luma histogram 82A and the third luma histogram 82C does not closely match and, thus, corresponding source image data is not expected to closely match.

Returning to the process 160 described in FIG. 16, the controller 40 may instruct the main pipeline 48 to determine whether the difference between the luma histograms is above a histogram threshold (decision block 168). In some embodiments, the histogram threshold may be predetermined and stored in the video encoding pipeline memory 72. As such, the main pipeline 48 may retrieve the histogram threshold and compare it with the difference between the luma histograms.

In some embodiments, the histogram threshold may be set such that differences greater than the histogram threshold indicates a large difference between source image data corresponding with the luma histograms 82 is expected. Thus, when the difference between luma histograms 82 is above the histogram threshold, the controller 40 may instruct the main pipeline 48 to determine that a scene change is expected to occur between the first image frame and the second image frame (process block 172). Since inter-frame prediction modes are premised on similarity between image frames, the controller 40 may instruct the main pipeline 48 to disable inter-frame prediction modes (process block 174). As such, the mode decision block 58 may select from candidate intra-frame prediction modes and/or a skip mode.

On the other hand, when the difference between luma histograms 82 is not above the histogram threshold, enough similarities in the corresponding source image data is expected to be present to enable inter-frame prediction techniques. Thus, when the difference between luma histograms 82 is not above the histogram threshold, the controller 40 may instruct the main pipeline 48 to enable inter-frame prediction modes (process block 170). As such, the mode decision block 58 may select from candidate intra-frame prediction modes as well as candidate inter-frame prediction modes and/or a skip mode.

Figure 19:
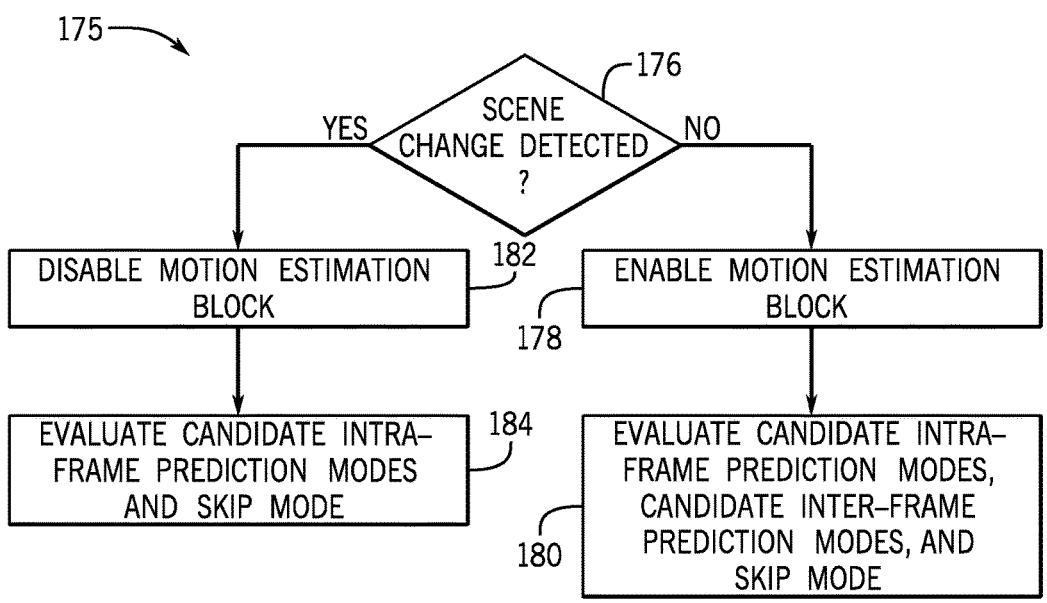
FIG. 19 is a process for operating the video encoding pipeline of FIG. 6 based on whether a scene change is detected, in accordance with an embodiment.

As described above, using statistics determined by the low resolution motion estimation block 68 may facilitate improving operational efficiency of the main pipeline 48 via indication of scene changes. To help illustrate, one embodiment of a process 175 for operating the main pipeline 48 is described in FIG. 19. Generally, the process 175 includes determining whether a scene change is detected (decision block 176). When a scene change is detected, the process 174 includes enabling a motion estimation block (process block 178) and evaluating candidate inter-frame prediction modes, candidate intra-frame prediction modes, and a skip mode (process block 180). When a scene change is not detected, the process 174 includes displaying the motion estimation block (process block 182) and evaluating candidate intra-frame prediction modes and a skip mode (process block 184). In some embodiments, the process 174 may be implemented by executing instructions stored in a tangible, non-transitory, computer-readable medium, such as video encoding pipeline memory 72, controller memory 44, local memory 20, main memory storage device 22, or the like, using processing circuitry, such as the controller processor 42, processor core complex 18, a graphics processing unit (GPU), or the like.

Accordingly, in such embodiments, the controller 40 may instruct the main pipeline 48 to determine whether a scene change is expected to occur (decision block 180). As described above, a scene change may be detected based at least in part on statistics determined by the low resolution motion estimation block 68. For example, a scene change may be detected when a zero vector sum of absolute difference 84 is above the upper SAD threshold, a difference between luma histograms 82 is above the luma threshold, or both.

When a scene change is not expected to occur, the controller 40 may enable the motion estimation block 52 in the main pipeline 48 and instruct the motion estimation block 52 to determine candidate inter-frame prediction modes (process block 178). As described above, the motion estimation block 52 may determine candidate inter-frame prediction modes based at least in part on low resolution inter-frame prediction modes determined by the low resolution motion estimation block 68. More specifically, the low resolution inter-frame prediction may provide an indication where closely matching reference samples are likely to be located. Thus, initializing the motion estimation block 52 with low resolution inter-frame prediction modes as candidates may improve operational efficiency of the motion estimation block 52 and, thus, the main pipeline 48.

The controller 40 may then instruct the mode decision block 58 in the main pipeline 48 to evaluate candidate intra-frame prediction modes, candidate inter-frame predictions modes, and a skip mode (process block 180). In some embodiments, the mode decision block 58 may evaluate the various prediction modes by comparing associated rate-distortion costs. When rate-distortion cost of equation (1) is used, the mode decision block 58 may select a prediction mode with the lowest associated rate-distortion cost.

As described above, effectiveness of inter-frame prediction techniques is greatly reduced across a scene change. As such, when a scene change is expected to occur, the controller 40 may instruct the mode decision block 58 in the main pipeline 48 to only evaluate candidate intra-frame prediction modes and a skip mode (process block 184). When rate-distortion cost of equation (1) is used, the mode decision block 58 may select a prediction mode with the lowest associated rate-distortion cost.

In some embodiments, since the mode decision block 58 does not evaluate candidate inter-frame prediction modes, the controller 40 may disable the motion estimation block 52 in the main pipeline (process block 182). Disabling the motion estimation block 52 may reduce amount of computation performed by the main pipeline 48, which may facilitate improving operational efficiency and/or reducing power consumption.

Accordingly, the technical effects of the present disclosure include improving operational efficiency of a video encoding pipeline used to encode (e.g., compress) source image data. In some embodiments, the video encoding pipeline may include a low resolution pipeline in parallel with a main pipeline. In this manner, the low resolution pipeline may determine information, such as low resolution inter-frame prediction modes and/or statistics, that may be used in the main pipeline to improve operational efficiency. For example, low resolution inter-frame prediction modes may provide an indication of where reference samples are expected to be located, which may reduce motion estimation searching performed by the main pipeline. Additionally, the statistics may enable the main pipeline to determine where a scene change is expected to occur and adjust operation accordingly.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding pipeline comprising:
 a low resolution pipeline coupled to memory that stores source image data to be encoded by the video encoding system, wherein the low resolution pipeline comprises a low resolution motion estimation block configured to:
   determine first downscaled source image data generated by reducing a resolution of first source image data corresponding with a first image frame;
   generate second downscaled source image data by reducing a resolution of second source image data corresponding with a second image frame when the second source image data is retrieved from the memory;
   perform a first motion estimation search in the first downscaled source image data based on the second downscaled source image data to determine a first downscaled reference sample; and
   determine a low resolution inter-frame prediction mode that indicates location of the second source image data relative to a first reference sample corresponding with the downscaled reference sample; and
 a main pipeline coupled to the memory that stores the source image data to be encoded by the video encoding system, wherein the main pipeline comprises:
   a reconstruction block configured to determine first reconstructed image data by decoding encoded image data corresponding with the first source image data;
   a motion estimation block configured to determine a candidate inter-frame prediction mode by performing a second motion estimation search in the first reconstructed image data based at least in part on the low resolution inter-frame prediction mode; and
   a mode decision block configured to determine encoding parameters to be used to encode the second source image data based at least in part on a first rate-distortion cost associated with the candidate inter-frame prediction mode.

2. The video encoding pipeline system of claim 1, wherein:
 the low resolution motion estimation block is configured to determine statistics based at least in part on luma of the second downscaled image data;
 the main pipeline is configured to determine when a scene change is expected to occur based at least in part on the statistics; and
 the mode decision block is configured to determine the encoding parameters based at least in part on when the scene change is expected to occur.

3. The video encoding pipeline of claim 1, wherein the main pipeline comprises:
 an inter-frame prediction block configured to determine a first luma prediction sample based at least in part on the candidate inter-frame prediction mode;
 an intra-frame prediction block configured to:
   determine a candidate intra-frame prediction mode; and
   determine a second luma prediction sample based at least in part on the candidate intra-frame prediction mode;
 a back-end-filter block configured to filter second reconstructed image data, wherein the reconstruction block is configured to determine the second reconstructed image data by decoding second encoded image data generated by applying the encoding parameters determined by the mode decision block to the second source image data; and a syntax element binarization block configured to binarize syntax elements used to indicate the encoding parameters applied by the reconstruction block to determine the second reconstructed image data, filter parameters applied by the back-end-filter block to the second reconstructed image data, or both.

4. The video encoding pipeline of claim 3, wherein the mode decision block is configured to:
  determine the first rate-distortion cost based at least in part on the first luma prediction sample;
  determine a second rate-distortion cost associated with the candidate intra-frame prediction mode based at least in part on the second luma prediction sample;
  determine a third rate-distortion cost associated with a skip mode; and
  determine the encoding parameters based at least in part on a comparison between the first rate-distortion cost, the second rate-distortion cost, and the third rate-distortion cost.

5. The video encoding pipeline of claim 1, comprising a transcode pipeline coupled to the memory, wherein:
  the main pipeline is configured to:
    generate a bin stream by binarizing syntax elements used to indicate the encoding parameters determined by the mode decision block;
    output to the bin stream to the memory via direct memory access; and
  the transcode pipeline is configured to:
    retrieve the bin stream from the memory via direct memory access; and
    entropy encode the bin stream to generate a bit stream that indicates one or more of the syntax elements using fractional bits.

6. The video encoding pipeline of claim 1, wherein, to determine the low resolution inter-frame prediction mode, the low resolution motion estimation block is configured:
  determine a reference index that indicates temporal position of the first image frame corresponding with the first source image data relative to the second image frame corresponding with the second source image data; and
  determine a motion vector that indicates spatial position of the full resolution reference sample in the first image frame relative to the second source image data in the second image frame.

7. The video encoding pipeline of claim 1, wherein:
  the low resolution pipeline is configured to retrieve the second source image data from the memory using direct memory access; and
  the main pipeline is configured to retrieve the second image data and the low resolution inter-frame prediction mode from the memory using direct memory access.

8. The video encoding pipeline of claim 1, wherein the second downscaled image data comprises a resolution that is one-sixteenth a resolution of the second source image data.

9. A tangible, non-transitory, computer-readable medium that stores instructions executable by one or more processors in a computing device, wherein the instructions comprise instructions to:
  instruct, using the one or more processors, a video encoding pipeline implemented in the computing device to generate first downscaled source image data by downscaling first source image data corresponding with a first image frame;
  instruct, using the one or more processors, the video encoding pipeline to generate second downscaled source image data by downscaling the second source image data corresponding with a second image frame;
  instruct, using the one or more processors, the video encoding pipeline to determine a low resolution inter-frame prediction mode by performing a first motion estimation search in the first downscaled source image data based on the second downscaled source image data to determine a downscaled reference sample;
  instruct, using the one or more processors, the video encoding pipeline to determine reconstructed image data by decoding first encoded image data corresponding with the first source image data;
  instruct, using the one or more processors, the video encoding pipeline to determine a candidate inter-frame prediction mode by performing a second motion estimation search in the reconstructed image data corresponding with the first source image data based on the low resolution inter-frame prediction mode;
  instruct, using the one or more processors, the video encoding pipeline to determine encoding parameters to be used to encode the second source image data based at least in part on a rate-distortion cost associated with the candidate inter-frame prediction mode; and
  instruct, using the one or more processors, the video encoding pipeline to generate second encoded image data corresponding with the second source image data by applying the encoding operational parameters.

10. The computer-readable medium of claim 9, comprising instructions to instruct, using the one or more processors, the video encoding pipeline to determine statistics based at least in part on luma of the first source image data and luma of the second source image data, wherein:
  the statistics comprise an indication of when a scene change is expected to occur; and
  the instruction to instruct the video encoding pipeline to determine the encoding operational parameters comprise instructions to instruct the video encoding pipeline to determine a prediction technique used to encode the second source image data based at least in part on when the scene change is expected to occur.

11. The computer-readable medium of claim 9, wherein the instructions to downscale the image data comprise instructions to reduce resolution of the image by one-sixteenth.

12. The computer-readable medium of claim 9, wherein the instructions to instruct the video encoding pipeline to determine the low resolution inter-frame prediction mode comprise instructions to:
  determine a motion vector that indicates position of a reference sample corresponding with the downscaled reference sample in the first image frame relative to position of the second source image data in the second image frame; and
  determine a reference index that indicates display order of the first image frame relative to the second image frame.

13. The computer-readable medium of claim 9, wherein the instructions to instruct the video encoding pipeline to determine the candidate inter-frame prediction mode comprise instructions to:
  perform the second motion estimation search in the reconstructed image data corresponding with the first source image data based on the second source image data to determine a reference sample, wherein the low resolution inter-frame prediction mode provides an indication of where the reference sample is expected to be located in the first image frame;

determine a motion vector that indicates spatial position of the reference sample in the first image frame relative to position of the second source image data in the second image frame; and determine a reference index that indicates display order of the first image frame relative to the second image frame.

14. The computer-readable medium of claim 9, wherein the encoding operational parameters comprise prediction techniques used to encode a coding block, a number of prediction units in the coding block, a size of the prediction units, a prediction mode used to encode each of the prediction units, a number of transform units in the coding block, a size of the transform units, whether to split the coding unit into smaller coding units, or any combination thereof.

15. A video encoding system comprising:
memory configured to store source image data corresponding with image frames to be encoded by the video encoding system, wherein each image frame is divided into a plurality of coding units and each of the plurality of coding units comprises one or more prediction units;

a low resolution motion estimation circuitry coupled to the memory, wherein the low resolution motion estimation circuitry is configured to:
retrieve first source image data corresponding with a first coding unit in a first image frame and downscaled source image data corresponding with a second image frame from the memory using direct memory access;
downscale the first source image data to generate a first downscaled coding unit, wherein the first downscaled coding unit comprises a first downscaled prediction unit corresponding with a first prediction unit in the first coding unit; and
determine a first low resolution inter-frame prediction mode by performing a first motion estimation search in the downscaled source image data corresponding with the second image frame based on the first downscaled prediction unit in the first downscaled coding unit to determine a first downscaled reference sample; and a main pipeline coupled to the memory in parallel with the low resolution motion estimation circuitry, wherein the main pipeline is configured to:
retrieve the first source image data corresponding with the first coding unit and the first low resolution inter-frame prediction mode from the memory using direct memory access; and
determine a first prediction mode to be used to encode the first source image data corresponding with the first prediction unit in the first coding unit based at least in part on the first low resolution inter-frame prediction mode.

16. The video encoding system of claim 15, wherein:
the first downscaled coding unit comprises a second downscaled prediction unit corresponding with a second prediction unit in the first coding unit;
the low resolution motion estimation circuitry is configured to determine a second low resolution inter-frame prediction mode by performing a second motion estimation search in the downscaled source image data corresponding with the second image frame based on the second downscaled prediction unit in the first downscaled coding unit to determine a second downscaled reference sample; and the main pipeline is configured to:
retrieve the second low resolution inter-frame prediction mode from the memory using direct memory access; and
determine a second prediction mode used to encode the first source image data corresponding with the second prediction unit in the first coding unit based at least in part on the first low resolution inter-frame prediction mode and the second low resolution inter-frame prediction mode.

17. The video encoding system of claim 15, wherein:
the low resolution motion estimation circuitry is configured to:
retrieve second source image data corresponding with a second coding unit in the first image frame from the memory using direct memory access;
downscale the second source image data to generate a second downscaled coding unit, wherein the second downscaled coding unit comprises a second downscaled prediction unit corresponding with a second prediction unit in the second coding unit; and
determine a second low resolution inter-frame prediction mode by performing a second motion estimation search in the downscaled source image data corresponding with the second image frame based on the second downscaled prediction unit in the second downscaled coding unit to determine a second downscaled reference sample; and the main pipeline configured to:
retrieve the second source image data corresponding with the second coding unit and the second low resolution inter-frame prediction mode from the memory using direct memory access; and
determine a second prediction mode to be used to encode the second source image data corresponding with the second prediction unit in the second coding unit based at least in part on the second low resolution inter-frame prediction mode.

18. The video encoding pipeline of system 15, wherein the first coding unit is a 64×64 sample.

19. The video encoding pipeline of system 15, wherein the second image frame is configured to be display directly before or directly after the first image frame.

20. A computing device comprising:
an image data source configured to generate first image data corresponding with a first image and second image data corresponding with a second image;
a low resolution motion estimation pipeline comprising first image data processing circuitry programmed to:
generate first downscaled image data by downscaling the first image data generated by the image data source when the low resolution motion estimation pipeline receives the first image data;
when the low resolution motion estimation pipeline receives the second image data:
generate second downscaled image data by downscaling the second image data generated by the image data source;
perform a first motion estimation search in the first downscaled image data based on the second downscaled image data to determine a low resolution inter-frame prediction mode; and
determine statistics based at least in part on luma of the second downscaled image data; and
a main video encoding pipeline configured to generate first encoded image data by encoding the first image data and second encoded image data by encoding the second image data, wherein the video encoding pipeline comprises second processing circuitry programmed to:
  determine first reconstructed image data by decoding the first encoded image data; and
  when the main video encoding pipeline receives the second image data:
    determine a candidate inter-frame prediction mode by performing a second motion estimation search in the first reconstructed image data based at least in part on the low resolution inter-frame prediction mode; and
    determine encoding operational parameters to be used to encode the second image data based at least in part on the candidate inter-frame prediction mode and the statistics determined by the low resolution motion estimation pipeline.

21. The computing device of claim 20, wherein the statistics comprise:
  a luma histogram configured to indicate number of pixels in the second downscaled image data at each luma value; and
  a zero vector sum of absolute difference between the second downscaled image data corresponding with the second image and a downscaled reference sample at a same position in the first image.

22. The computing device of claim 20, wherein:
  the low resolution motion estimation pipeline is configured to process the second image data corresponding with the second image frame while the main video encoding pipeline processes the first image data corresponding with the first image frame, wherein the second image frame to be displayed after the first image frame; and
  the main video encoding pipeline is configured to determine where a scene change is expected to occur based at least in part on the statistics to facilitate frame-rate conversion.

23. The computing device of claim 20, wherein the low resolution motion estimation pipeline is configured to process image data generated by the image data source in a downscaled resolution one or more image frames before the main video encoding pipeline processes the image data in a full resolution.

24. The computing device of claim 20, wherein the image data source comprises an image sensor configured to generate a digital representation of proximate physical features as source image data.

25. The computing display of claim 20, wherein the computing device comprises a portable phone, a media player, a personal data organizer, a handheld game platform, a tablet device, a computer, or any combination thereof.

26. The video encoding pipeline of claim 1, wherein the low resolution motion estimation block is configured to:
  determine third downscaled source image data generated by reducing resolution of third source image data corresponding with a third image frame;
  generate the first downscaled source image data by reducing resolution of the first source image data corresponding with the first image frame when the first source image data is retrieved from the memory;
  perform a third motion estimation search in the third downscaled image data based on the first downscaled source image data to determine another downscaled reference sample; and
  determine another low resolution inter-frame prediction mode that indicates location of the first source image data relative to another reference sample corresponding with the other downscaled reference sample.

27. The video encoding pipeline of claim 26, wherein:
  the reconstruction block configured to determine second reconstructed image data by decoding encoded image data corresponding with the third source image data;
  the motion estimation block configured to determine another candidate inter-frame prediction mode by performing a fourth motion estimation search in the second reconstructed image data based at least in part on the first source image data and the other low resolution inter-frame prediction mode; and
  the mode decision block configured to determine encoding parameters to be used to encode the first source image data based at least in part on a second rate-distortion cost associated with the other candidate inter-frame prediction mode.

28. The video encoding pipeline of claim 6, wherein, to determine a candidate inter-frame prediction mode, the a motion estimation block is configure to:
  determine a search area in the first image frame centered around the spatial position indicated by the motion vector of the low resolution motion estimation block; and
  perform the second motion estimation search in the reconstructed image data corresponding with the search area to determine a second reference sample corresponding with the second source image data.

* * * * *

UNITED STATES PATENT AND TRADEMARK OFFICE
CERTIFICATE OF CORRECTION

PATENT NO. : 10,187,655 B2
APPLICATION NO. : 14/871827
DATED : January 22, 2019
INVENTOR(S) : Jim C. Chou et al.

It is certified that error appears in the above-identified patent and that said Letters Patent is hereby corrected as shown below:

In the Claims

Column 34, Line 5 (Claim 1), please replace "system" with --pipeline--.
Column 34, Line 22 (Claim 1), please insert --first-- before "downscaled".
Column 34, Line 25 (Claim 1), please replace "system" with --pipeline--.
Column 34, Line 40 (Claim 2), please replace "system" with --pipeline--.
Column 34, Line 44 (Claim 2), please insert --source-- before "image".
Column 35, Line 36 (Claim 6), please insert --to-- after "configured".
Column 35, Line 43 (Claim 6), please replace "the full" with --a full--.
Column 35, Line 51 (Claim 7), please insert --source-- before "image".
Column 36, Line 1 (Claim 9), please delete "the" before "second".
Column 36, Line 20 (Claim 9), please insert --operational-- before "parameters".
Column 36, Line 42 (Claim 11), please insert --first source-- before "image".
Column 36, Line 43 (Claim 11), please replace "the image" with --the first image frame--.
Column 37, Line 14 (Claim 14), please replace "unit" with --block--.
Column 38, Line 39 (Claim 18), please delete "pipeline of" before "system".
Column 38, Line 41 (Claim 19), please delete "pipeline of" before "system".
Column 38, Line 42 (Claim 19), please replace "display" with --displayed--.
Column 39, Line 1 (Claim 20), please insert --main-- before "video".
Column 39, Line 33 (Claim 22), please insert --is-- after "frame".
Column 39, Line 42 (Claim 23), please insert --of-- after "resolution".
Column 40, Line 15 (Claim 26), please insert --source-- before "image".
Column 40, Line 38 (Claim 28), please replace "a candidate" with --the candidate--.
Column 40, Line 38 (Claim 28), please delete "a" after "the".
Column 40, Line 39 (Claim 28), please replace "configure" with --configured--.

Signed and Sealed this
Third Day of March, 2020

Andrei Iancu
*Director of the United States Patent and Trademark Office*